United States Patent
Kashiwagi et al.

(10) Patent No.: US 11,722,791 B2
(45) Date of Patent: Aug. 8, 2023

(54) RANGING DEVICE, IMAGE PROCESSING DEVICE AND METHOD

(71) Applicant: KABUSHIKI KAISHA TOSHIBA, Tokyo (JP)

(72) Inventors: Masako Kashiwagi, Kawasaki (JP); Nao Mishima, Inagi (JP); Akihito Seki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/900,918

(22) Filed: Sep. 1, 2022

(65) Prior Publication Data

US 2023/0126635 A1 Apr. 27, 2023

(30) Foreign Application Priority Data

Oct. 27, 2021 (JP) .................................. 2021-175694

(51) Int. Cl.
*H04N 23/959* (2023.01)
*H04N 23/67* (2023.01)

(52) U.S. Cl.
CPC ......... *H04N 23/959* (2023.01); *H04N 23/671* (2023.01)

(58) Field of Classification Search
CPC .. H04N 23/959; H04N 23/671; H04N 23/675; G06T 7/194; G06T 5/50; G06T 7/571
See application file for complete search history.

(56) References Cited

U.S. PATENT DOCUMENTS

| | | | |
|---|---|---|---|
| 10,951,835 B1* | 3/2021 | Kashiwagi | H04N 23/675 |
| 2015/0178970 A1* | 6/2015 | Pham | G06T 5/002 |
| | | | 382/190 |
| 2016/0093032 A1* | 3/2016 | Lei | G06T 5/50 |
| | | | 382/264 |
| 2020/0051264 A1 | 2/2020 | Mishima et al. | |
| 2020/0265565 A1* | 8/2020 | Hwang | G06T 7/194 |
| 2020/0294260 A1* | 9/2020 | Kashiwagi | G06T 7/571 |
| 2021/0082146 A1 | 3/2021 | Kashiwagi et al. | |

FOREIGN PATENT DOCUMENTS

| | | |
|---|---|---|
| JP | 2020-026990 A | 2/2020 |
| JP | 2020-148483 A | 9/2020 |
| JP | 2021-043115 A | 3/2021 |

* cited by examiner

*Primary Examiner* — Hung H Lam
(74) *Attorney, Agent, or Firm* — Oblon, McClelland, Maier & Neustadt, L.L.P.

(57) ABSTRACT

According to one embodiment, a ranging device includes storage and a processor. The storage is configured to store a statistical model generated by learning a bokeh that occurs in a first image affected by aberration of an optical system of a capture unit. The processor is configured to acquire a second image captured by the capture unit, acquire focus position information when the second image was captured, acquire a bokeh value indicating a bokeh of a subject in the second image, which is output from the statistical model by inputting the acquired second image to the statistical model, and convert the acquired bokeh value into a distance to the subject based on the acquired focus position information.

10 Claims, 21 Drawing Sheets

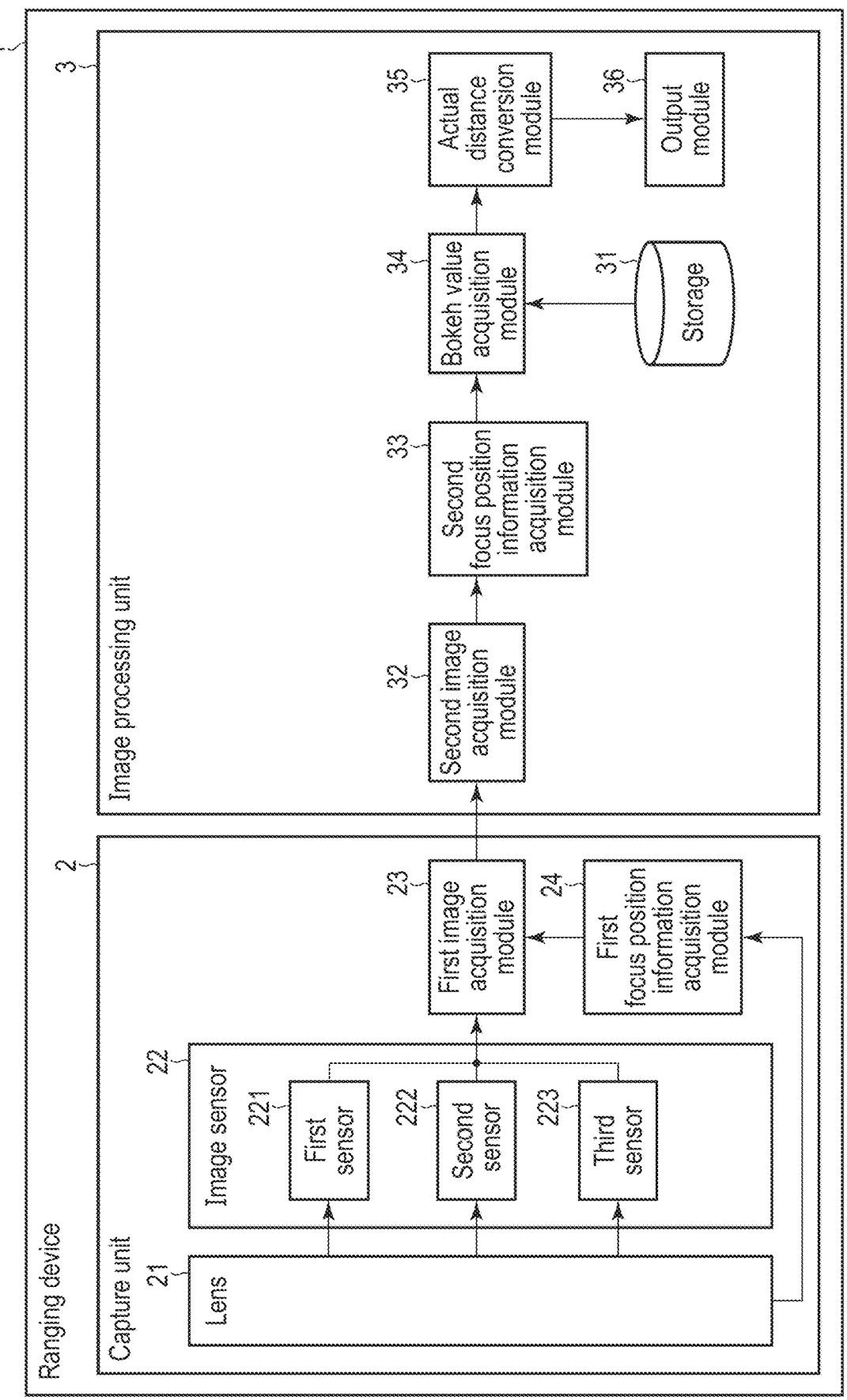
F I G. 1

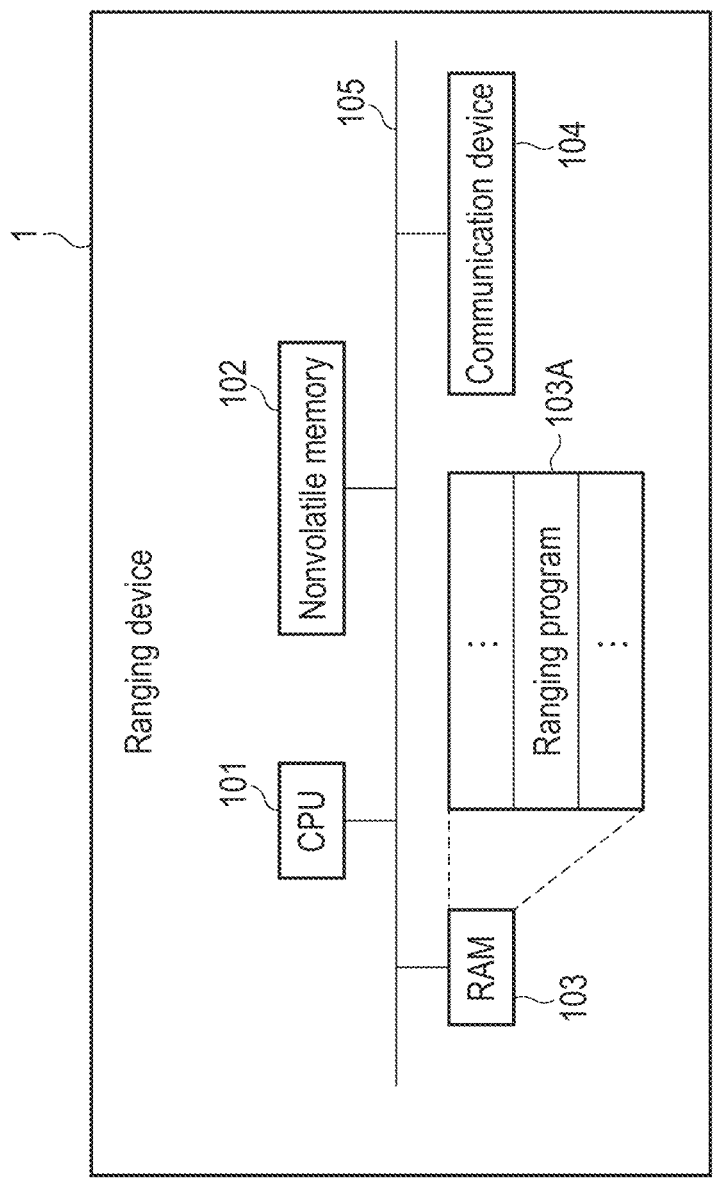
F I G. 2
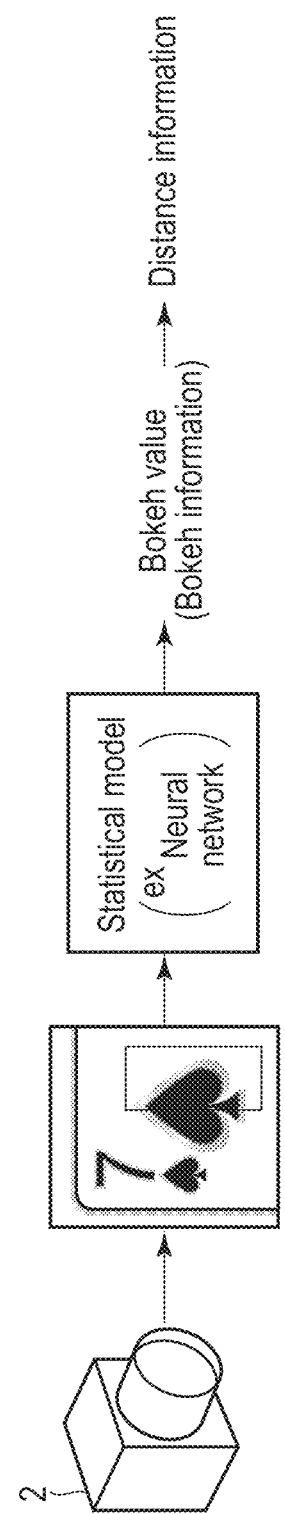
F I G. 3

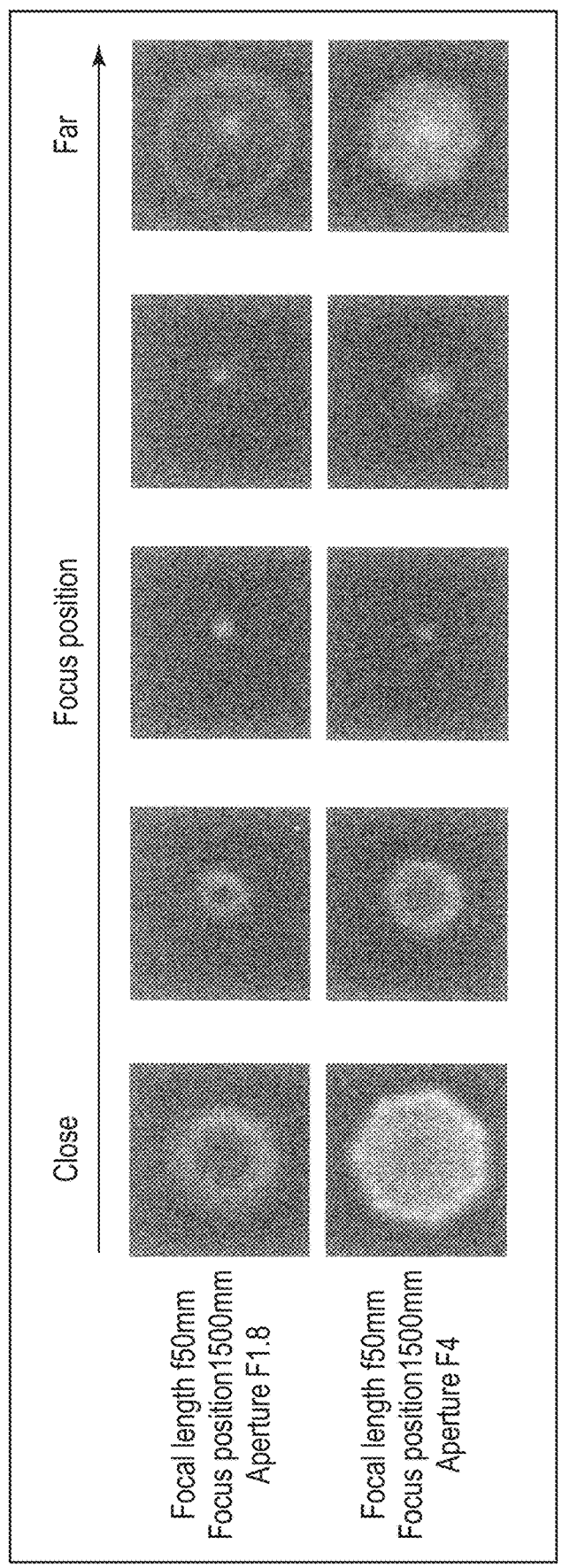
F I G. 6

| Shape | Close | Far |
|---|---|---|
| Circle (Without PSF asymmetry) | ○ | ○ |
| Even-numbered square Line-symmetrical arrangement (Without PSF asymmetry) | ⬡ | ⬡ |
| Odd-numbered square (With PSF asymmetry) | ⬠ | ⬠ |
| Even-numbered square Asymmetric arrangement (With PSF asymmetry) | ⬡ | ⬡ |

FIG. 11

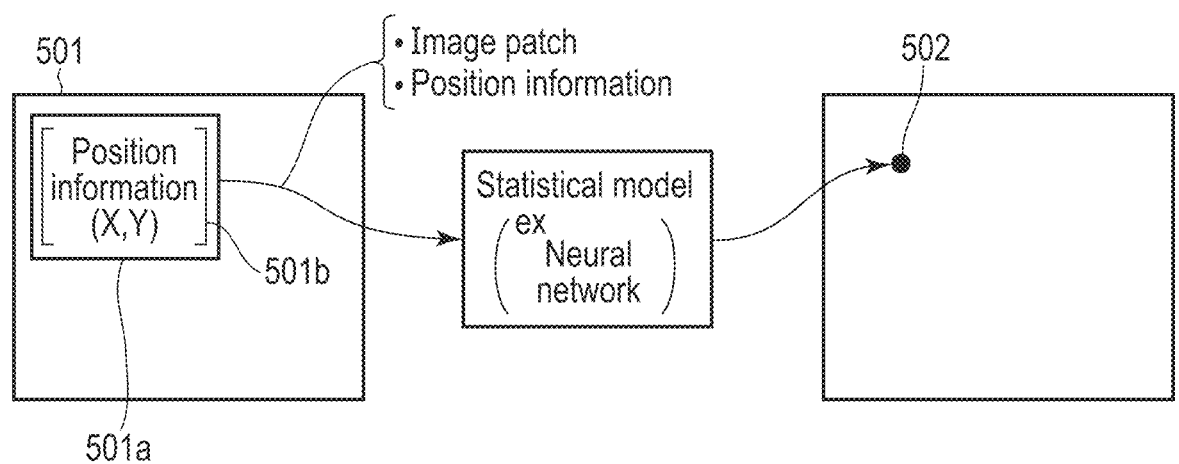
F I G. 14

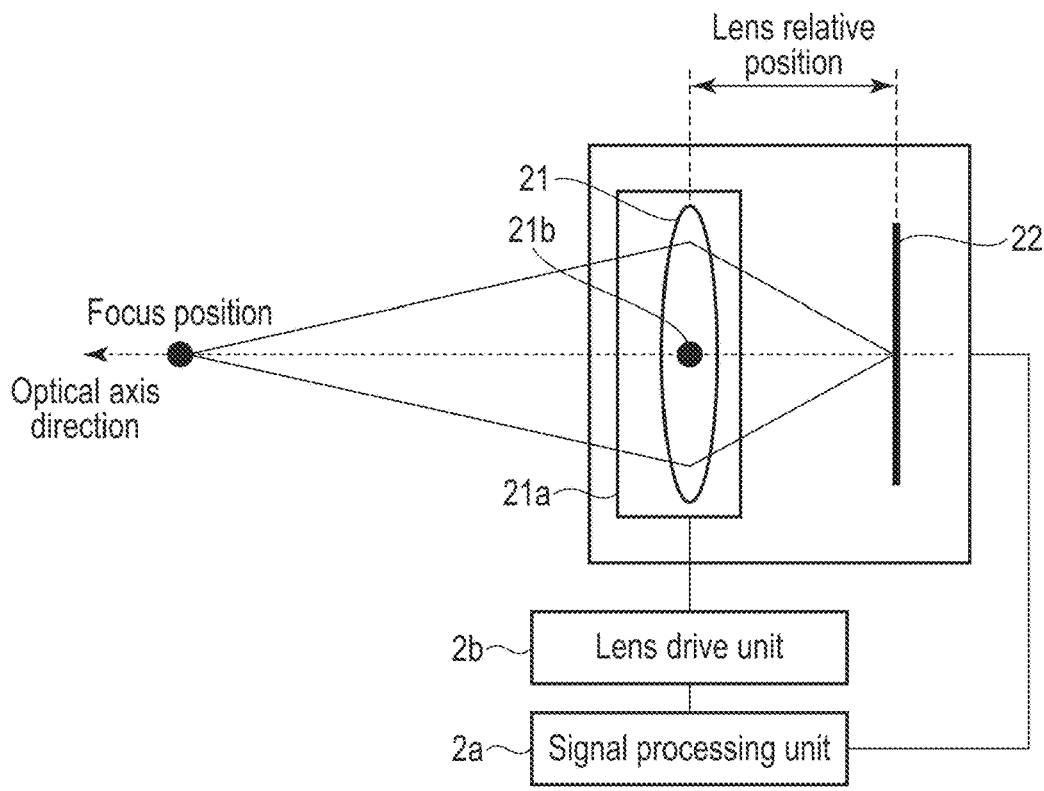
F I G. 21
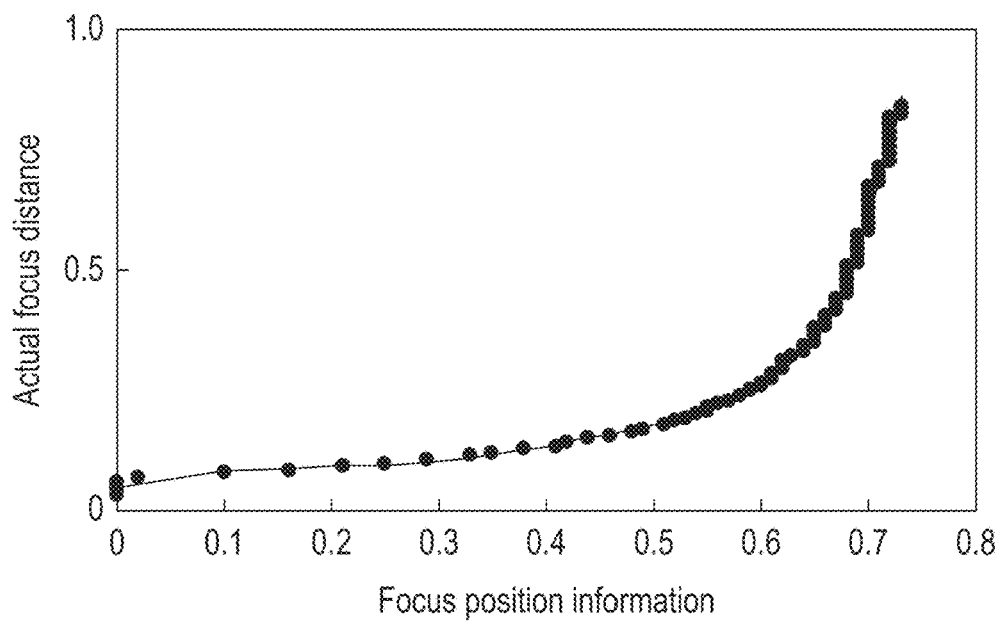
F I G. 22

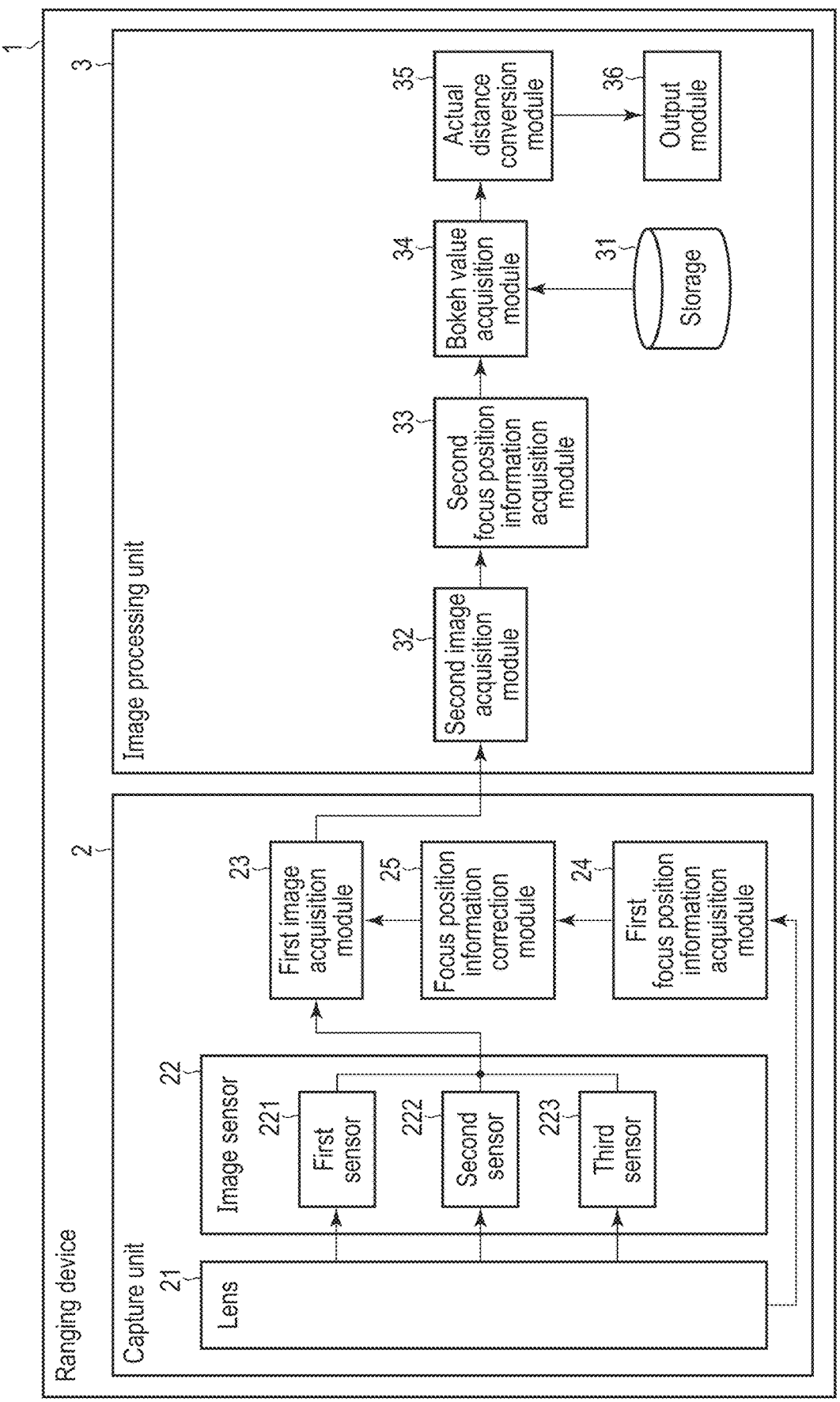
F I G. 23

RANGING DEVICE, IMAGE PROCESSING DEVICE AND METHOD

CROSS-REFERENCE TO RELATED APPLICATIONS

This application is based upon and claims the benefit of priority from Japanese Patent Application No. 2021-175694, filed Oct. 27, 2021, the entire contents of which are incorporated herein by reference.

FIELD

Embodiments described herein relate generally to a ranging device, an image processing device, and a method.

BACKGROUND

Generally, it has been known to use images captured by two capture devices (cameras) or stereo cameras (compound eye cameras) to measure (acquire) the distance to a subject. However, in recent years, a technique for measuring the distance to a subject using images captured by a single capture device (monocular camera) has been disclosed.

However, in the case of measuring the distance to a subject (actual distance between a subject and a capture device) from an image captured by a single capture device, the accuracy of the distance may be low.

BRIEF DESCRIPTION OF THE DRAWINGS

FIG. 1 shows an example of a configuration of a ranging device according to an embodiment.

FIG. 2 shows an example of a system configuration of the ranging device.

FIG. 3 illustrates an overview of the operation of the ranging device.

FIG. 6 shows a relationship between the size of an opening of an aperture mechanism provided in an optical system of a capture unit and a PSF shape.

FIG. 11 shows a relationship between nonlinearity of the PSF shape and the shape of the opening of the aperture mechanism.

FIG. 14 illustrates a second method for estimating a bokeh from an image.

FIG. 21 illustrates focus position information.

FIG. 22 shows the correspondence between the focus position information and an actual focus distance.

FIG. 23 shows another example of the configuration of the ranging device.

DETAILED DESCRIPTION

Figure 4:
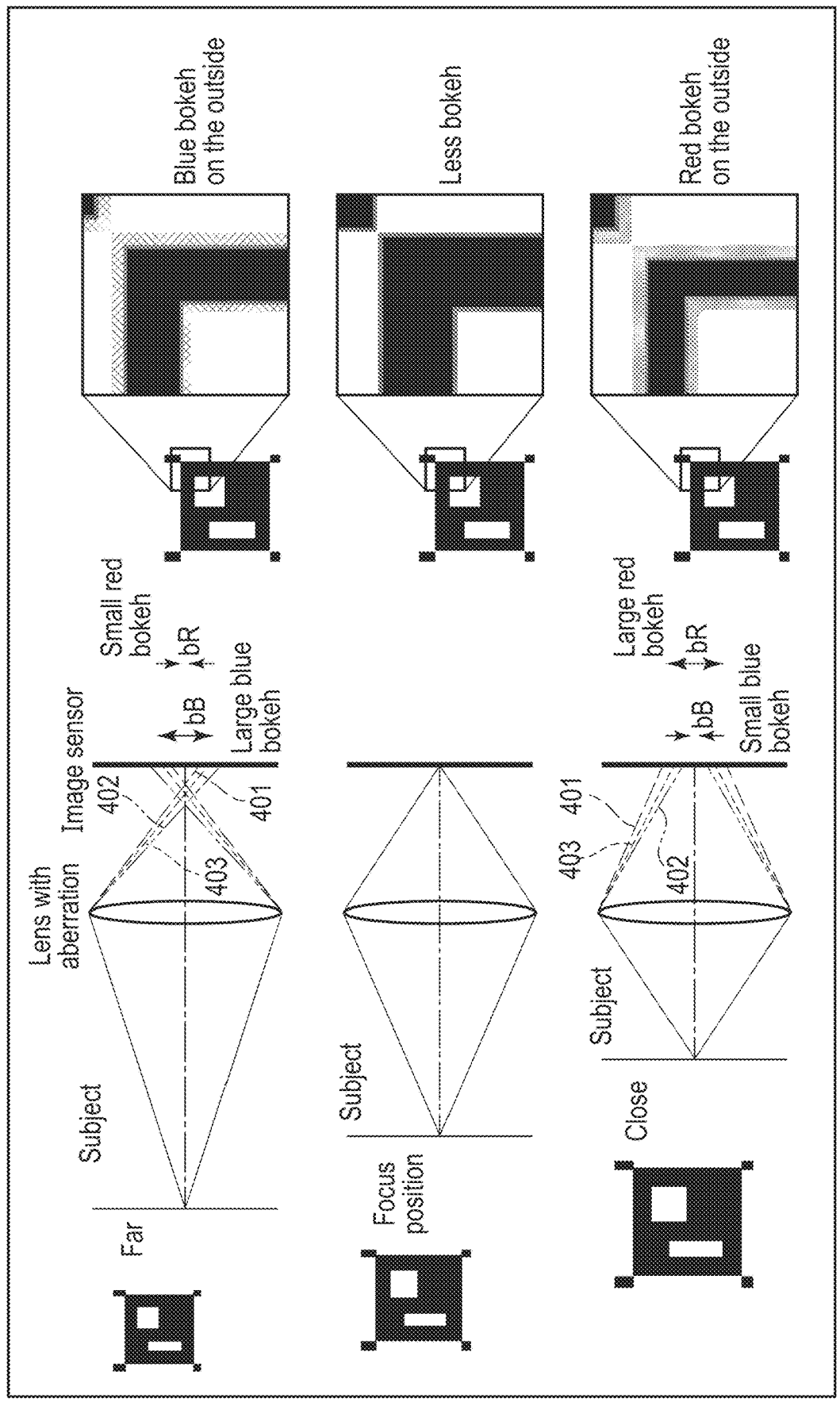
FIG. 4 shows a relationship between the distance to a subject and a bokeh that occurs in an image due to chromatic aberration in the case of using a single lens.

In general, according to one embodiment, a ranging device including a capture unit is provided. The ranging device includes storage and a processor. The storage is configured to store a statistical model generated by learning a bokeh that occurs in a first image affected by aberration of an optical system of the capture unit and that changes nonlinearly according to a distance to a subject in the first image. The processor is configured to acquire a second image captured by the capture unit and affected by aberration of the optical system of the capture unit, acquire focus position information relating to a focus position when the second image was captured, acquire a bokeh value indicating a bokeh of a subject in the second image, which is output from the statistical model by inputting the acquired second image to the statistical model, and convert the acquired bokeh value into a distance to the subject based on the acquired focus position information.

Various embodiments will be described with reference to the accompanying drawings.

FIG. 1 shows an example of a configuration of a ranging device according to the present embodiment. A ranging device 1 shown in FIG. 1 is used to capture an image and measure (acquire) the distance from an imaging point to a subject using the captured image.

As shown in FIG. 1, the ranging device 1 includes a capture unit 2 and an image processing unit 3. In the present embodiment, the ranging device 1 is described as a single device including the capture unit 2 and the image processing unit 3. However, the ranging device 1 may also be a ranging system (image processing system) in which, for example, the capture unit 2 and the image processing unit 3 are each realized as separate devices such as a capture device and an image processing device. In the case where the ranging device 1 includes the capture unit 2 and the image processing unit 3, for example, a digital camera, a smartphone, and a tablet computer can be used as the ranging device 1. On the other hand, in the case where the ranging system is realized by the capture unit 2 and the image processing unit 3 as separate devices such as a capture device and an image processing device, for example, a digital camera can be used as the capture device, and a personal computer, a smartphone, or a tablet computer can be used as the image processing device. In this case, the image processing device may operate as a server device that executes, for example, cloud computing services.

The capture unit 2 is realized by a camera (capture device) incorporated in the ranging device 1, and includes a lens 21 and an image sensor 22. The lens 21 and the image sensor 22 correspond to an optical system (monocular camera) of the capture unit 2.

In the present embodiment, the lens 21 configures a lens unit together with a signal processing unit (signal processing circuit) and a lens driving unit (lens driving circuit), etc., for controlling a focus position by adjusting the position of the lens 21, an aperture mechanism having an opening for adjusting the amount of light (incident light) taken into the optical system of the capture unit 2 and an aperture control circuit, etc., and a control circuit, etc., on which a memory holding information relating to the lens 21 (hereinafter referred to as lens information) is mounted.

In the present embodiment, the lens 21 (lens unit) may be manually replaced with other lenses. In this case, a user can use the ranging device 1 by attaching one of a plurality of types of lenses such as a standard lens, a telephoto lens, and a wide-angle lens to the ranging device 1. Note that, in the case where the lens is replaced, a focal length and an F-number (aperture value) will change, allowing images to be captured according to the lens used on the ranging device 1.

In the present embodiment, the focal length refers to a distance from the lens to a position where light converges when the light is incident parallel to the lens. The F-number is a numerical value of the amount of light captured by the capture unit 2 (image sensor 22) according to the aperture mechanism. Note that a smaller F-number indicates a larger amount of light captured in the capture unit 2 (i.e., the size of the opening becomes larger).

Light reflected by a subject enters the lens 21. The light incident on the lens 21 transmits through the lens 21. The light transmitted through the lens 21 reaches the image sensor 22 and is received (detected) by the image sensor 22. The image sensor 22 converts the received light into an electrical signal (photoelectric conversion) to generate an image configured by a plurality of pixels.

The image sensor 22 can be realized by, for example, a change coupled device (CCD) image sensor and a complementary metal oxide semiconductor (CMOS) image sensor. The image sensor 22 includes, for example, a first sensor (R sensor) 221 that detects light in a red (R) wavelength band, a second sensor (G sensor) 222 that detects light in a green (G) wavelength band, and a third sensor (B sensor) 223 that detects light in a blue (B) wavelength band. The image sensor 22 can receive lights in the corresponding wavelength bands by the first to third sensors 221 to 223 and generate sensor images (R image, G image, and B image) corresponding to each wavelength band (color component). In other words, the image captured by the capture unit 2 is a color image (RGB image), and the image includes the R image, the G image, and the B image.

Note that, in the present embodiment, the image sensor 22 is described as including the first to third sensors 221 to 223. However, the image sensor 22 need only be configured to include at least one of the first to third sensors 221 to 223. Furthermore, the image sensor 22 can also be configured to include, for example, a sensor for generating a monochrome image instead of the first to third sensors 221 to 223.

An image generated based on the light transmitted through the lens 21 in the present embodiment is an image affected by aberration of the optical system (lens 21) of the capture unit 2 and includes a bokeh caused by the aberration. Note that the details of the bokeh occurred in the image are described below.

As shown in FIG. 1, the capture unit 2 further includes a first image acquisition module 23 and a first focus position information acquisition module 24.

The first image acquisition module 23 acquires an image captured by the capture unit 2 (camera). The image acquired by the first image acquisition module 23 is transmitted from the capture unit 2 to the image processing unit 3.

The first focus position information acquisition module 24 acquires information relating to a focus position (a position in focus in the image) when the image was captured by the capture unit 2 (hereinafter referred to as "focus position information"). The focus position information acquired by the first focus position information acquisition module 24 is added to the image acquired by the first image acquisition module 23 described above and is transmitted from the capture unit 2 to the image processing unit 3.

The image processing unit 3 is connected to the capture unit 2 and includes storage 31, a second image acquisition module 32, a second focus position information acquisition module 33, a bokeh value acquisition module 34, an actual distance conversion module 35, and an output module 36.

The storage 31 stores a statistical model used to measure the distance to a subject from images captured by the capture unit 2. The statistical model stored in the storage 31 is generated by learning a bokeh that occurs in images affected by the aberration of the optical system of the capture unit 2 described above and that changes nonlinearly according to the distance to the subject in the image.

Note that the statistical model can be generated by applying various known machine learning algorithms, such as neural networks or random forests. Also, neural networks applicable in the present embodiment may include, for example, convolutional neural networks (CNN), all-associative neural networks, and recurrent neural networks.

The second image acquisition module 32 acquires the image transmitted from the capture unit 2 described above. The second focus position information acquisition module 33 acquires the focus position information added to the image acquired by the second image acquisition module 32 (i.e., the image transmitted from the capture unit 2).

The bokeh value acquisition module 34 inputs the image acquired by the second image acquisition module 32 to the statistical model stored in the storage module 31 to acquire a bokeh value that is output from the statistical model, which indicates a bokeh occurred on the subject in the image.

Based on the focus position information acquired by the second focus position information acquisition module 33, the actual distance conversion module 35 converts the bokeh value acquired by the bokeh value acquisition module 34 into a distance to the subject in the image acquired by the second image acquisition module 32 (i.e., an actual distance from the ranging device 1 to the subject).

The output module 36 outputs (distance information indicating) the distance to the subject converted from the bokeh value by the actual distance conversion module 35.

FIG. 2 shows an example of a system configuration of the ranging device 1. The ranging device 1 includes a CPU 101, a nonvolatile memory 102, a RAM 103, and a communication device 104. The ranging device 1 also includes a bus 105 that interconnects the CPU 101, the nonvolatile memory 102, the RAM 103, and the communication device 104.

Note that it is assumed that the distance measuring device 1 according to the present embodiment incorporates a camera including the lens 21 and the image sensor 22 described in FIG. 1. However, the camera is omitted in FIG. 2.

The CPU 101 is a processor for controlling the operation of various components in the ranging device 1. The CPU 101 may be a single processor or may be configured by multiple processors. Although a central processing unit (CPU) is used here as a processor that controls the operation of the components, a graphics processing unit (GPU) may also be used. The CPU 101 executes various programs that are loaded from the nonvolatile memory 102 into the RAM 103. These programs include an operating system (OS) and various application programs, including, for example, a ranging program 103A.

The nonvolatile memory 102 is a storage medium used as an auxiliary storage device. The RAM 103 is a storage medium used as a main storage device. In FIG. 2, only the nonvolatile memory 102 and the RAM 103 are shown. However, the ranging device 1 may also include, for example, a hard disk drive (HDD) and a solid state drive (SSD).

Note that, in the present embodiment, the storage 31 shown in FIG. 1 is realized by, for example, the nonvolatile memory 102 or other storage devices.

Furthermore, in the present embodiment, it is assumed that some or all of the first image acquisition module 23, the first focus position information acquisition module 24, the second image acquisition module 32, the second focus position information acquisition module 33, the bokeh value acquisition module 34, the actual distance conversion module 35, and the output module 36 are realized by executing the ranging program 103A on the CPU 101 (i.e., the computer of the ranging device 1), that is, by software. This ranging program 103A may be distributed by being stored on a computer-readable storage medium or downloaded to the ranging device 1 through a network. Note that some or all of these modules 23, 24 and 32 to 36 may be realized by hardware such as an integrated circuit (IC), or by a combination of software and hardware.

Here, each of the modules 23, 24 and 32 to 36 included in the ranging device 1 are described as being realized by a single program (ranging program 103A). However, for example, the first image acquisition module 23 and the first focus position information acquisition module 24 included in the capture unit 2 may be realized by a program (software) different from that realizing the second image acquisition module 32, the second focus position information acquisition module 33, the bokeh value acquisition module 34, the actual distance conversion module 35, and the output module 36 included in the image processing unit 3.

The communication device 104 is a device configured to execute wired or wireless communication.

Although omitted in FIG. 2, the ranging device 1 may further include other devices such as input devices and display devices.

Next, an overview of the operation of the ranging device 1 in the present embodiment will be described with reference to FIG. 3. In the ranging device 1, the capture unit 2 (image sensor 22) captures an image affected by the aberration of the optical system (lens 21) of the capture unit 2 as described above.

The image processing unit 3 (second image acquisition module 32) acquires the image captured by the capture unit 2 and inputs the image to the statistical model stored in the storage 31.

As described above, the statistical model in the present embodiment is generated by learning a bokeh that changes nonlinearly according to the distance to the subject in the image. Therefore, in a case where an image is input to the statistical model, a bokeh value (bokeh information) indicating a bokeh that occurs in the image according to the distance to the subject in the image is output from the statistical model. As described below, there is a correlation between the distance to the subject in the image and the color, size, and shape of the bokeh that occurs in the image according to the distance. Therefore, the image processing unit 3 (actual distance conversion module 35) can acquire the distance to the subject by converting the bokeh value output from the statistical model into a distance.

Thus, in the present embodiment, the statistical model can be used to measure the distance to a subject (distance information) from an image captured by the capture unit 2.

Here, the image captured by the capture unit 2 in the present embodiment has a bokeh caused by the aberration (lens aberration) of the optical system of the capture unit 2 as described above. The following describes the bokeh that has occurred in the image captured by the capture unit 2. First, chromatic aberration of the optical system of the imaging unit 2 will be described.

FIG. 4 shows a relationship between the distance to a subject and the bokeh in an image caused by chromatic aberration.

A refractive index of light when transmitted through the lens 21 with aberration differs for each wavelength band. Therefore, for example, in a case where the position of a subject is out of focus, light in each wavelength band will not be concentrated at a single point but will reach different points. This is what appears as chromatic aberration (bokeh) in an image.

The upper row of FIG. 4 shows a case in which the position of the subject with respect to the ranging device 1 (image sensor 22) is farther than the focus position (i.e., the position of the subject is beyond the focus position).

In this case, for a light 401 in the red wavelength band, the image sensor 22 (first sensor 221) generates an image including a relatively small bokeh $b_R$. On the other hand, for a light 402 in the blue wavelength band, the image sensor 22 (third sensor 223) generates an image including a relatively large bokeh $b_B$. Note that, for a light 403 in the green wavelength band, an image including a bokeh having an intermediate size between the bokeh $b_R$ and the bokeh $b_B$ is generated. Therefore, in such an image captured in a state where the position of the subject is farther than the focus position, a blue bokeh is confirmed on the outside of the subject in the image.

On the other hand, the lower row of FIG. 4 shows a case in which the position of the subject with respect to the ranging device 1 (image sensor 22) is closer than the focus position (i.e., the position of the subject is in front of the focus position).

In this case, for the light 401 in the red wavelength band, the image sensor 22 (first sensor 221) generates an image including a relatively large bokeh $b_R$. On the other hand, for the light 402 in the blue wavelength band, the image sensor 22 (third sensor 223) generates an image including a relatively small bokeh $b_B$. Note that, for the light 403 in the green wavelength band, an image including a bokeh having an intermediate size between the bokeh $b_R$ and the bokeh $b_B$ is generated. Therefore, in such an image captured in a state where the position of the subject is closer than the focus position, a red bokeh is observed on the outside of the subject in the image.

Here, FIG. 4 shows an example in which the lens 21 is a simple single lens. However, in some cases, for example, a lens with chromatic aberration correction (hereinafter referred to as a "color canceling lens") may be used as the lens 21. Note that a color canceling lens is a lens that combines a low-dispersion convex lens and a high-dispersion concave lens, and has the fewest number of lenses as a lens for correcting chromatic aberration.

Figure 5:
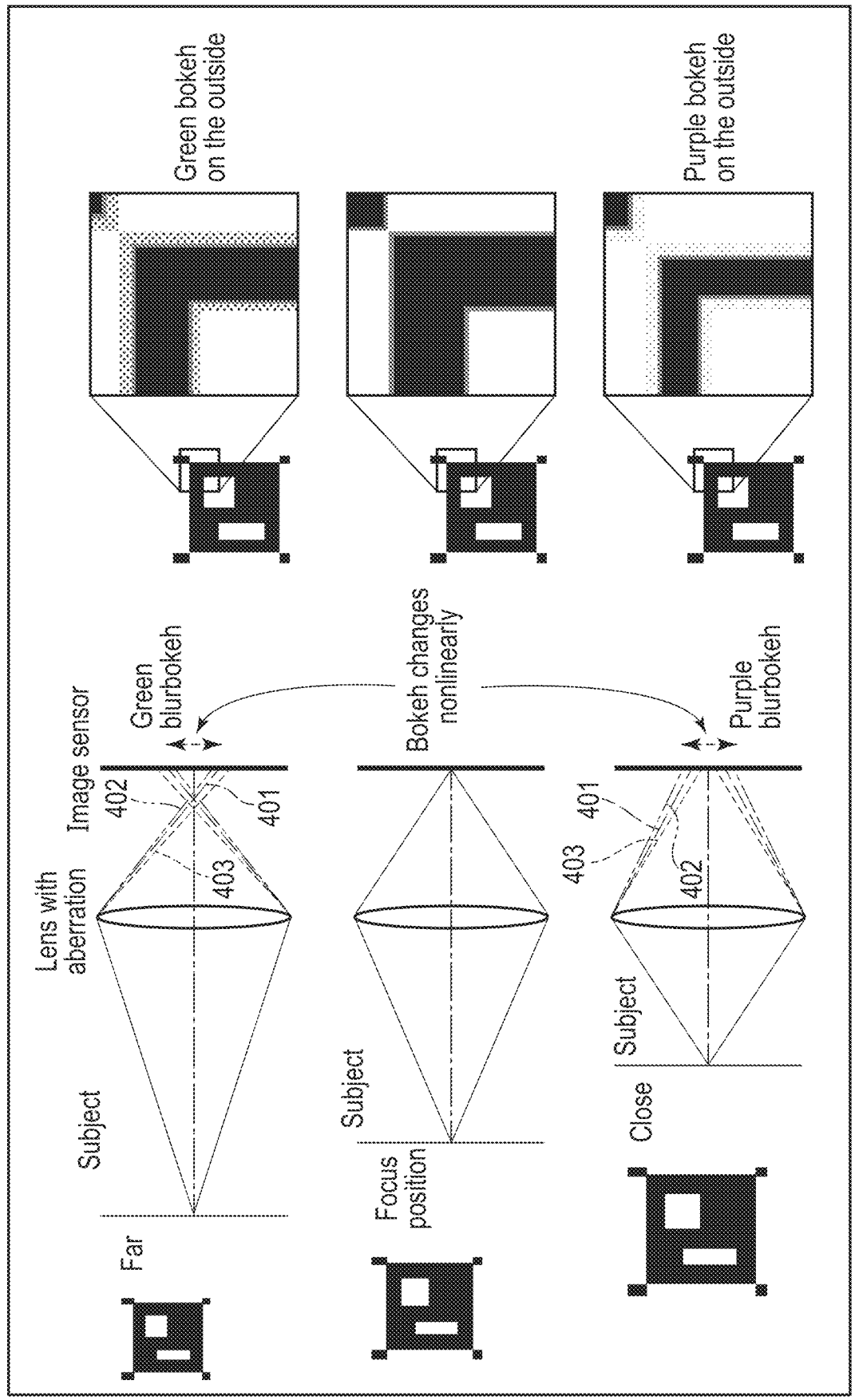
FIG. 5 shows a relationship between the distance to a subject and a bokeh that occurs in an image due to chromatic aberration in the case of using a color canceling lens.

FIG. 5 shows a relationship between the distance to the subject and the bokeh occurred in the image due to chromatic aberration in the case of using the above-mentioned color canceling lens as the lens 21. Although the focus positions of the blue and red wavelengths are designed to be aligned in the color cancelling lens, chromatic aberration cannot be completely eliminated. Therefore, in a case where the position of the subject is farther than the focus position, a green bokeh occurs as shown in the upper row of FIG. 5, and, in a case where the position of the subject is closer than the focus position, a purple bokeh occurs as shown in the lower row of FIG. 5.

The middle rows of FIG. 4 and FIG. 5 show a case where the position of the subject with respect to the ranging device 1 (image sensor 22) coincides with the focus position. In this case, the image sensor 22 (first to third sensors 221 to 223) generates an image with less bokeh.

Here, the optical system (lens unit) of the capture unit 2 includes the aperture mechanism as described above. However, the shape of the bokeh occurred in the image captured by the capture unit 2 depends on the size of the opening of the aperture mechanism. Note that the shape of the bokeh is referred to as a point spread function (PSF) shape, which indicates a diffusion distribution of light generated when a point light source is captured.

The upper row of FIG. 6 shows the PSF shape generated in the center of the image captured by the capture unit 2 in a case where the focus position is 1500 mm and the F-number (aperture) is F1.8 in (the optical system of) the capture unit 2 that uses a lens with a focal length of 50 mm, where the PSF shape is shown from the left in an order in which the position of the subject is closer to the ranging device 1. The lower row of FIG. 6 shows the PSF shape generated in the center of the image captured by the capture unit 2 in a case where the focus position is 1500 mm and the F-number (aperture) is F4 in (the optical system of) the capture unit 2 that uses a lens with a focal length of 50 mm, where the PSF shape is shown from the left in an order in which the position of the subject is closer to the ranging device 1. Note that the center of the upper and lower rows of FIG. 6 shows the PSF shape in a case where the position of the subject coincides with the focus position.

The PSF shapes shown in corresponding positions in the upper and lower rows of FIG. 6 are the PSF shapes in the case where the positions of the subject with respect to the ranging device 1 are the same. However, even in the case where the positions of the subject are the same, the PSF shape in the upper row (PSF shape in an image captured at the F-number of F1.8) is different from that in the lower row (PSF shape in an image captured at the F-number of F4).

Furthermore, as shown in the leftmost PSF shape and the rightmost PSF shape in FIG. 6, for example, even in the case where the distance from the position of the subject to the focus position is about the same, the PSF shapes differ between the case where the position of the subject is closer than the focus position and the case where the position of the subject is farther than the focus position.

Figure 7:
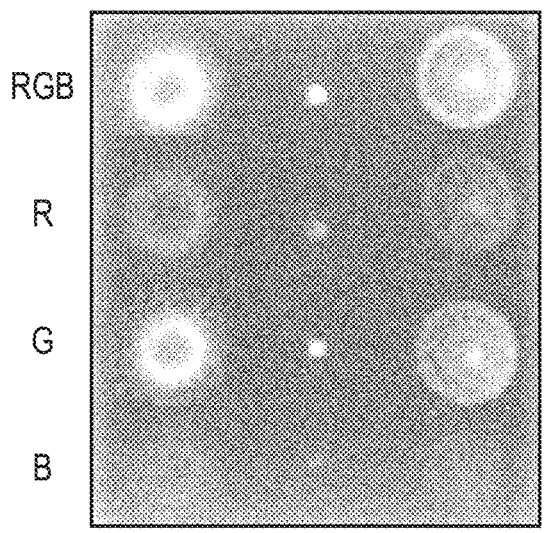
FIG. 7 shows an example of the PSF shape generated in an image of each channel.
Figure 8:
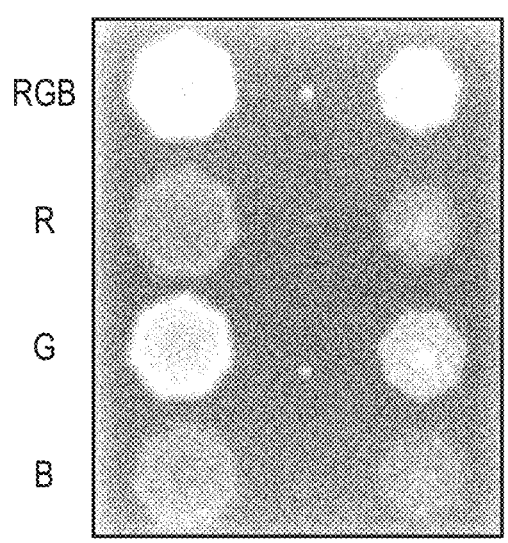
FIG. 8 shows another example of the PSF shape generated in the image of each channel.

Note that the above phenomenon in which the PSF shapes differ according to the size of the opening of the aperture mechanism and the position of the subject with respect to the ranging device 1 also occurs in the same manner for each channel (RGB image, R image, G image, and B image). FIG. 7 shows the PSF shape generated in the image of each channel captured by the capture unit 2 in a case where the focus position is 1500 mm and the F-number is F1.8 in the capture unit 2 that uses a lens with a focal length of 50 mm, where the PSF shape is shown separately for the case where the subject position is closer than (in front of) the focus position and the case where the subject position is farther than (beyond) the focus position. FIG. 8 shows the PSF shape generated in the image of each channel captured by the capture unit 2 in a case where the focus position is 1500 mm and the F-number is F4 in the capture unit 2 that uses a lens with a focal length of 50 mm, where the PSF shape is shown separately for the case where the subject position is closer than the focus position and the case where the subject position is farther than the focus position.

Furthermore, the PSF shape generated in the image captured by the capture unit 2 varies depending on the position in the image.

Figure 9:
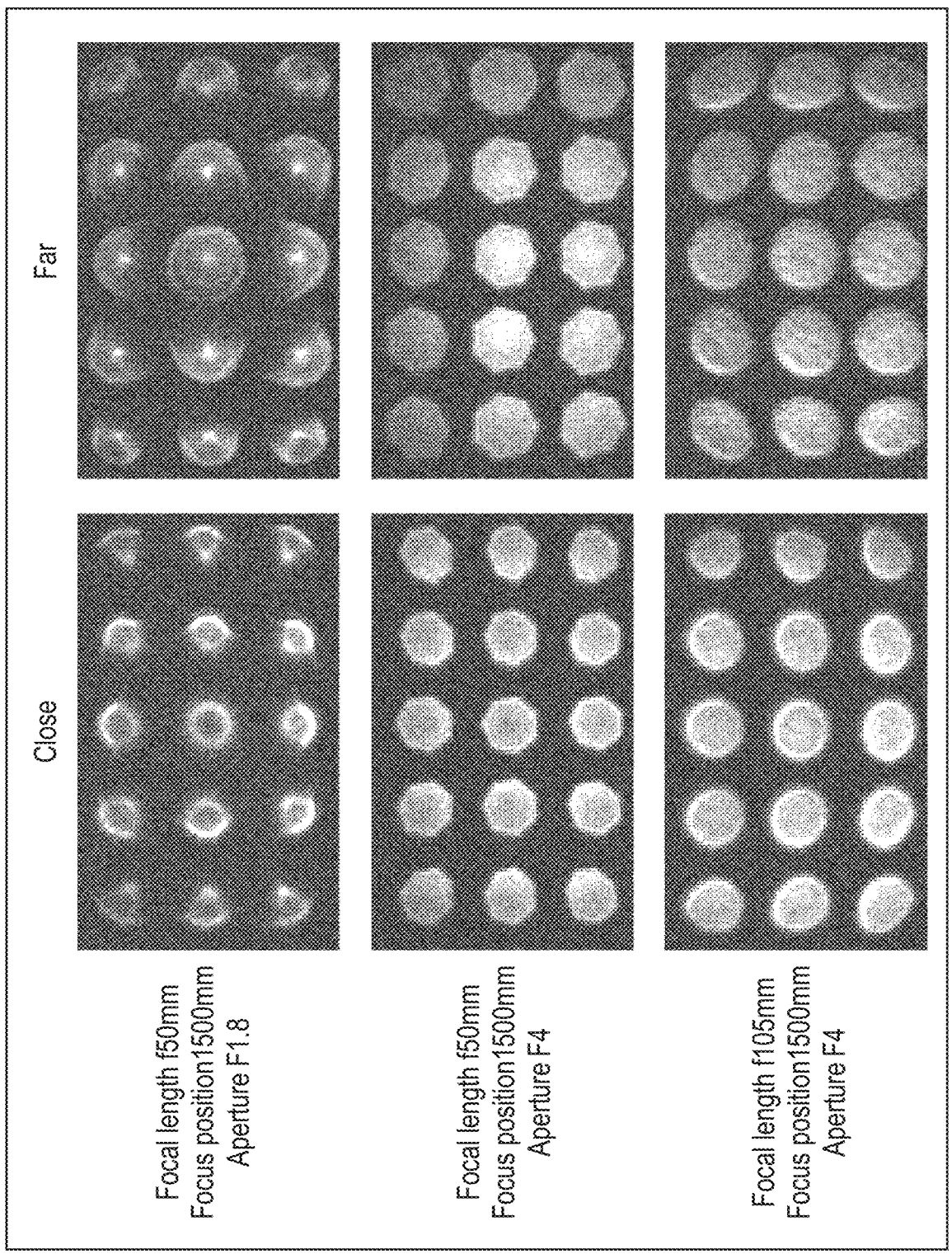
FIG. 9 shows an example of the PSF shape generated at each position in the image.

The upper row of FIG. 9 shows the PSF shape generated at each position in the image captured by the capture unit 2 in the case where the focus position is 1500 mm and the F-number is F1.8 in the capture unit 2 that uses a lens with the focal length of 50 mm, where the PSF shape is shown separately for the case where the subject position is closer than the focus position and the case where the subject position is farther than the focus position.

The middle row of FIG. 9 shows the PSF shape generated at each position in the image captured by the capture unit 2 in the case where the focus position is 1500 mm and the F-number is F4 in the capture unit 2 that uses a lens with the focal length of 50 mm, where the PSF shape is shown separately for the case where the subject position is closer than the focus position and the case where the subject position is farther than the focus position.

As shown in the upper and middle rows of FIG. 9, near the edges of the image captured by the capture unit 2 (especially near the corners on the upper left, etc.), for example, a PSF shape that is different from that positioned near the center of the image can be observed.

Furthermore, the lower row of FIG. 9 shows the PSF shape generated at each position in the image captured by the capture unit 2 in the case where the focus position is 1500 mm and the F-number is F4 in the capture unit 2 that uses a lens with the focal length of 105 mm, where the PSF shape is shown separately for the case where the subject position is closer than the focus position and the case where the subject position is farther than the focus position.

The upper and middle rows of FIG. 9 above show the PSF shapes generated in images captured using the same lens. However, as shown in the lower row of FIG. 9, in a case where a lens with a different focal length is used, a different PSF shape (a PSF shape different from those in the upper and middle rows of FIG. 9) is observed in accordance with the lens concerned.

Figure 10:
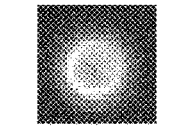
FIG. 10 specifically illustrates positional dependency of the PSF shape according to the type of lens.

Next, with reference to FIG. 10, positional dependency of the PSF shape (lens aberration) according to the type of lens used in the optical system of the capture unit 2 described above is described in detail. FIG. 10 shows the PSF shapes generated near the center (center of the screen) and near the edges (edges of the screen) of an image captured using multiple lenses of different focal lengths, where the PSF shape is shown separately for the case where the subject position is closer than the focus position and the case where the subject position is farther than the focus position.

As shown in FIG. 10, the PSF shapes generated near the center of the image are generally circular and identical even in the case where the lens types are different. However, the PSF shapes generated near the edge of the image are different from the PSF shapes generated near the center of the image, and each have characteristics (features) according to the lens types. Note that, the following points are in common even in the case where the types of lenses differ: a purple bokeh occurs near the edge of the PSF shape in the case where the subject position is closer than the focus position; and a green bokeh occurs near the edge of the PSF shape in the case where the subject position is farther than the focus position as explained in FIG. 5 above.

In FIG. 10, two examples (#1 and #2) are shown for a lens with a focal length of 50 mm. This indicates that the focal length of 50 mm is the same, but the manufacturer of the lens is different (i.e., they are different products). The same applies to the lens with the focal length of 85 mm.

As described above, the bokeh that changes nonlinearly according to the distance to the subject in the present embodiment includes the bokeh caused by the chromatic aberration of the optical system of the capture unit 2 described in FIG. 4 and FIG. 5 above, the bokeh caused by the size of the opening (i.e., F-number) of the aperture mechanism that adjusts the amount of light taken into the optical system of the capture unit 2 described in FIG. 6 to FIG. 8, and the bokeh that varies according to the position in the image captured by the capture unit 2 described in FIG. 9 and FIG. 10.

Note that the PSF shape also depends on the shape of the opening of the aperture mechanism. Here, FIG. 11 shows the relationship between the nonlinearity (asymmetry) of the PSF shape and the shape of the opening of the aperture mechanism. The nonlinearity of the PSF shape described above tends to occur in a case where the shape of the opening of the aperture mechanism is other than a circle. In particular, the nonlinearity of the PSF shape is more likely to occur in a case where the shape of the opening is an odd-numbered square or is an even-numbered square arranged asymmetrically with respect to a horizontal or vertical axis of the image sensor 22.

In the ranging device 1 of the present embodiment, the bokeh value indicating the bokeh occurred in the image is estimated (predicted) using a statistical model generated by focusing on the point where the bokeh (color, size, and shape) occurred in the image described above is a physical clue relating to the distance to the subject. Note that the bokeh value estimated by the statistical model in the present embodiment (i.e., output from the statistical model) is a scalar quantity that represents the amount of bokeh including the color, size, and shape of the bokeh that occurs in the image.

The following is an example of a method for estimating (a bokeh value indicating) a bokeh from an image by means of a statistical model in the present embodiment. Here, first to third methods are described.

Figure 12:
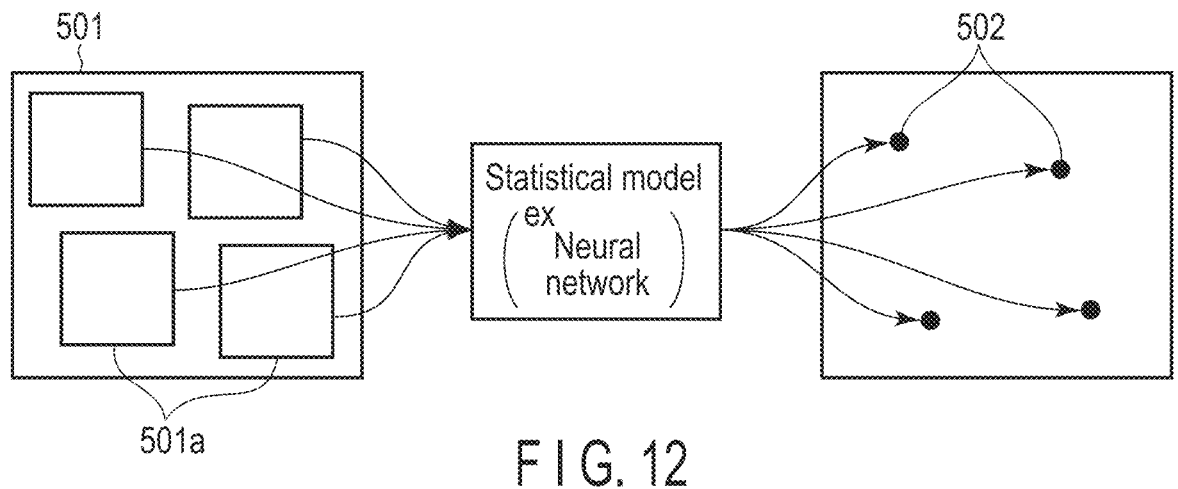
FIG. 12 illustrates a first method for estimating a bokeh from an image.

First, the first method is explained with reference to FIG. 12. In the first method, a local area (image patch) 501a is extracted from an image 501.

In this case, for example, the entire area of the image 501 may be divided into a matrix, and partial areas after the division may be extracted sequentially as the local area 501a, or the image 501 may be recognized, and the local area 501a may be extracted to cover the area where the subject (image) is detected. Furthermore, the local area 501a may partially overlap with other local areas 501a.

Next, for each extracted local area 501a, information relating to the local area 501a (information relating to the image 501) is input to the statistical model to estimate a bokeh value that indicates a bokeh that occurs according to the distance to the subject in the local area 501a.

The statistical model to which the information relating to the local area 501a is inputted in this manner estimates a bokeh value 502 for each pixel configuring the local area 501a.

Here, for example, in a case where a particular pixel belongs to both a first local area 501a and a second local area 501a (i.e., areas including the pixel overlap between the first local area 501a and the second local area 501a), the bokeh value estimating that the pixel belongs to the first local area 501a may differ from the bokeh value estimating that the pixel belongs to the second local area 501a.

Thus, for example, in a case where a plurality of partially overlapping local areas 501a are extracted as described above, the bokeh value of the pixels configuring the area where the plurality of local areas 501a overlap may be, for example, an average value of the bokeh value estimated for a part of the area (pixel) in one local area 501a overlapping the other local area 501a and the bokeh value estimated for a part of the area (pixel) in the other local area 501a. Furthermore, the bokeh value may be determined by a majority decision of the bokeh values estimated for a part of each area of the partially overlapping three or more local areas 501a.

Figure 13:
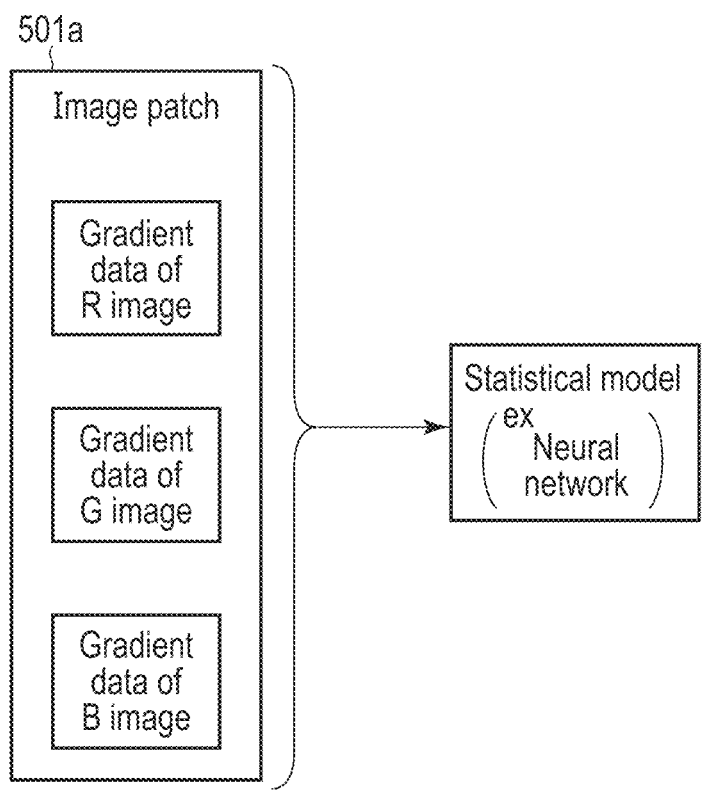
FIG. 13 shows an example of information input to a statistical model in the first method.

FIG. 13 shows an example of the information relating to the local area 501a that is input to the statistical model in the first method described above.

As shown in FIG. 13, gradient data of the local area 501a extracted from the image 501 is input to the statistical model. The gradient data of the local area 501a is generated from each of the R image, G image, and B image included in the image 501, and includes the gradient data of the R image, the gradient data of the G image, and the gradient data of the B image.

Note that the gradient data indicates a difference in pixel values (difference value) between each pixel and a pixel adjacent to the pixel. For example, in a case where the local area 501a is extracted as a rectangular area of n pixels (in an X-axis direction)×m pixels (in a Y-axis direction), gradient data is generated, in which, for example, the difference value for each pixel in the local area 501a calculated with respect to, for example, an adjacent pixel on the right is arranged in an n-row×m-row matrix.

The statistical model uses the gradient data of the R image, the gradient data of the G image, and the gradient data of the B image to estimate the bokeh value indicating the bokeh occurred in each of the images. FIG. 13 shows a case where the gradient data of each of the R image, the G image, and the B image is input to the statistical model. The gradient data of the image 501 (RGB image) may also be input to the statistical model.

Next, the second method is explained with reference to FIG. 14. In the second method, as information relating to the local area 501a in the first method, the gradient data for each local area (image patch) 501a and the position information of the local area 501a in the image 501 are input to the statistical model.

Position information 501b may, for example, indicate a center point or a predetermined side, such as the upper left side, of the local area 501a. In addition, a position of each of the pixels configuring the local area 501a on the image 501 may also be used as the position information 501b.

By further inputting the position information 501b to the statistical model as described above, a bokeh value 502 can be estimated by considering the difference between, for example, a bokeh of a subject image formed by light transmitted through the center of the lens 21 and a bokeh of a subject image formed by light transmitted through the edge of the lens 21.

In other words, according to this second method, the bokeh value can be estimated from the image 501 based on the correlation with the position on the image.

Figure 15:
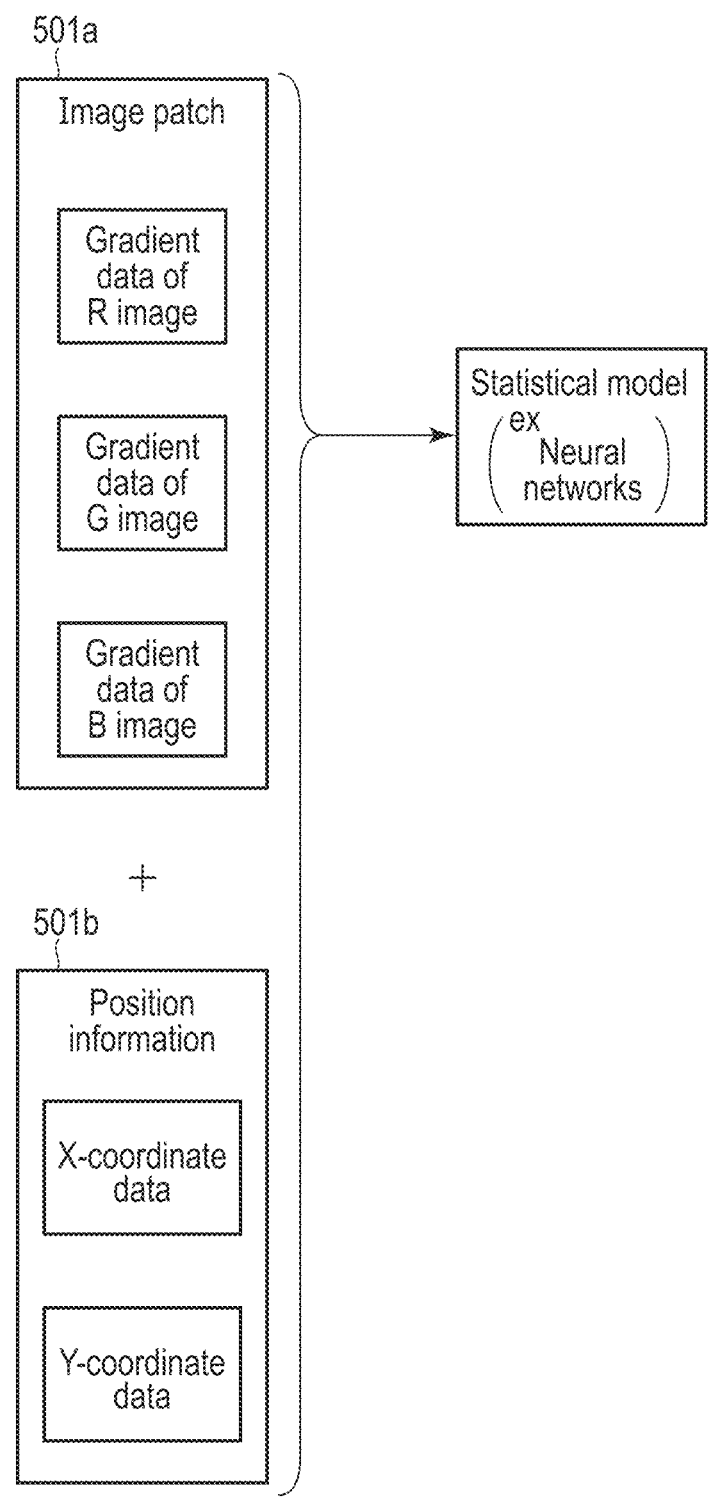
FIG. 15 shows an example of information input to a statistical model in the second method.

FIG. 15 shows an example of information relating to the local area 501a input to the statistical model in the second method described above.

For example, in a case where a rectangular area of n pixels (in the x-axis direction)×m pixels (in the y-axis direction) is extracted as the local area 501a, an X-coordinate value (X-coordinate data) and a Y-coordinate value (Y-coordinate data) on the image 501 corresponding to, for example, the center point of the local area 501a are obtained.

In the second method, the X-coordinate data and the Y-coordinate data acquired in this manner are input to the statistical model together with the gradient data of the R image, the G image, and the B image described above.

Figure 16:
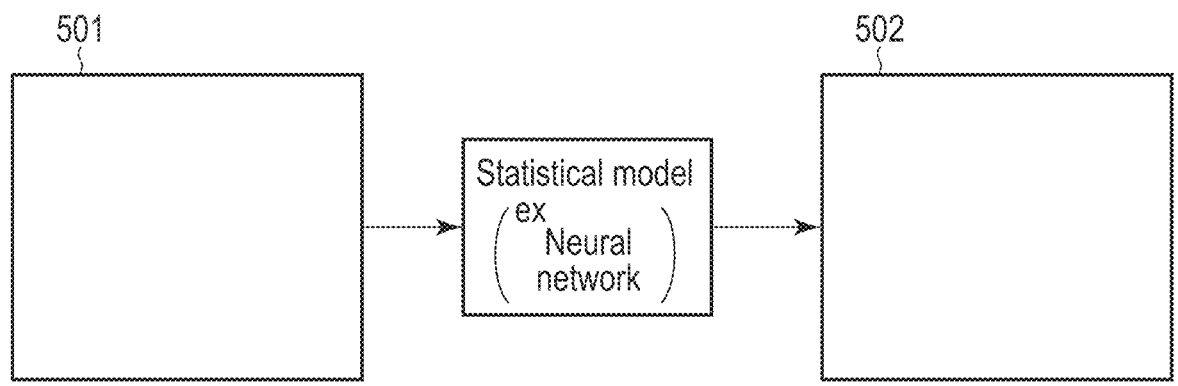
FIG. 16 illustrates a third method for estimating a bokeh from an image.

The third method is further explained with reference to FIG. 16. In the third method, the local area 501a is not extracted from image 501 as in the first and second methods described above. In the third method, for example, information relating to all areas of the image 501 (gradient data of the R image, the G image, and the B image) is input to the statistical model.

Compared to the first and second methods, which estimate the bokeh value 502 for each local area 501a, the third method may increase the uncertainty of the estimation by the statistical model, but can reduce the processing load for the estimation.

In the following explanation, the information input to the statistical model in the first to third methods above will be referred to as "image-related information" for convenience.

Here, the bokeh value is described as being estimated for each pixel; however, the bokeh value may be estimated for each predetermined area including at least one pixel.

The correlation between the bokeh occurred in the image and the distance to the subject in the image in the present embodiment is explained in detail below with reference to FIG. 17.

Figure 17:
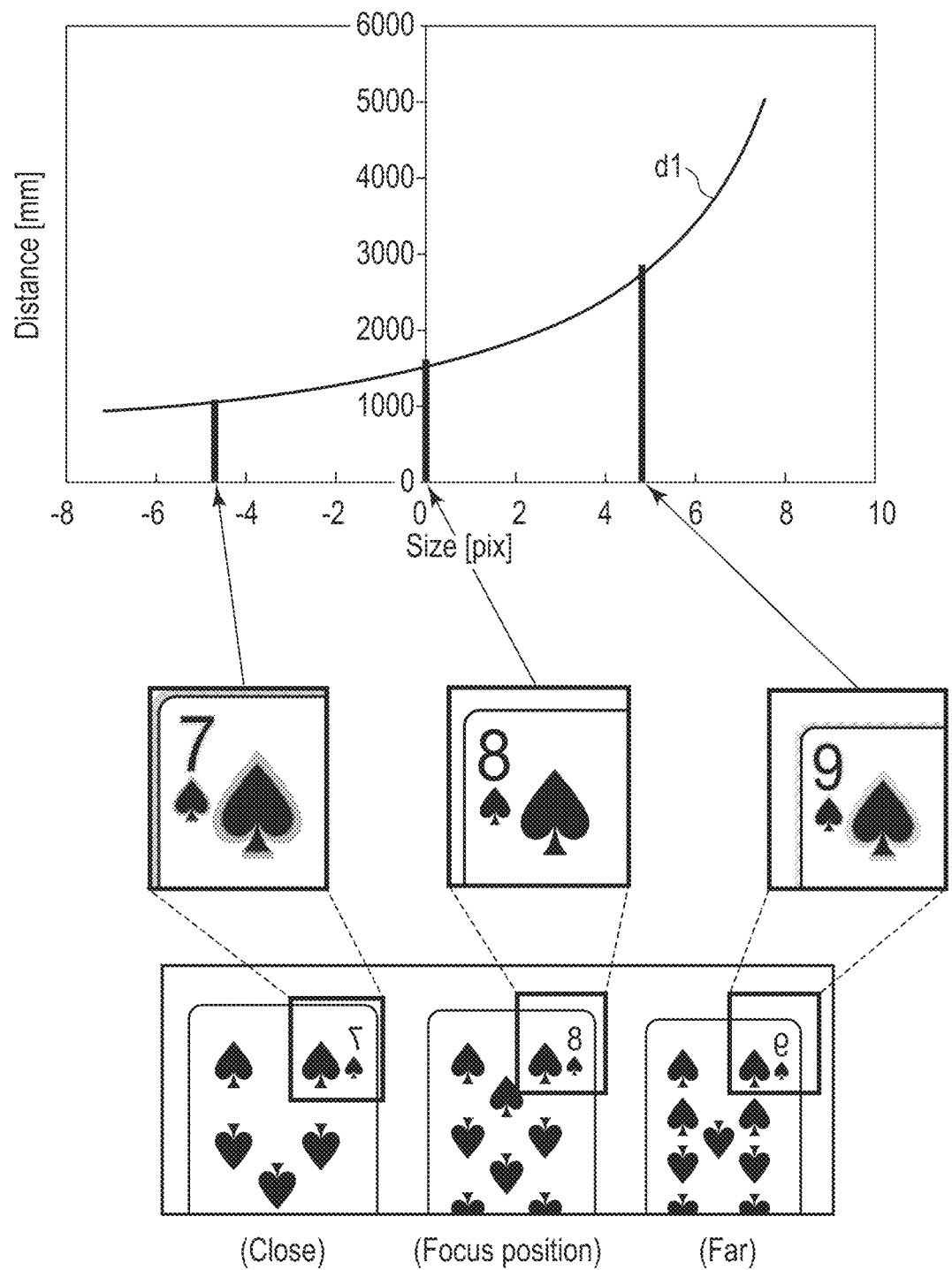
FIG. 17 specifically illustrates a correlation between a bokeh generated in an image and the distance to a subject in the image.

In FIG. 17, the size of the bokeh that occurs in a case where the subject is closer than (in front of) the focus position is shown as a negative value on the X-axis, and the size of the bokeh that occurs in a case where the subject is farther than (beyond) the focus position is shown as a positive value on the X-axis. In other words, as mentioned above, the color observed in the bokeh of a subject differs between a case where the position of the subject is closer than the focus position and the case where the position of the subject is farther than the focus position. Therefore, in FIG. 17, it may be considered that the color and size of the bokeh are indicated by positive and negative values.

FIG. 17 also shows that, in both cases where the subject is closer than the focus position and where the subject is farther than the focus position, the farther the subject is from the focus position, the larger the absolute value of the bokeh size (pixel) becomes.

The example shown in FIG. 17 assumes that the focus position in the optical system of the capture unit 2 that captured the image is approximately 1500 mm. In this case, for example, a bokeh of approximately −4.8 pixels corresponds to a distance of approximately 1000 mm from the optical system, a bokeh of 0 pixels corresponds to a distance of 1500 mm from the optical system, and a bokeh of approximately 4.8 pixels corresponds to a distance of approximately 750 mm from the optical system.

Here, for convenience, the case where the color and size (pixels) of the bokeh are shown on the x-axis is described. However, as explained in FIG. 6 to FIG. 10 above, the shape of the bokeh occurred in the image (PSF shape) also differs depending on a case where the subject is closer than the focus position and a case where the subject to farther than the focus position, and the position in the image. Therefore, the value shown on the X-axis in FIG. 17 (i.e., the bokeh value) is actually the value that reflects the shape of the bokeh (PSF shape).

Since there is a correlation between the distance to the subject and the color, size, and shape of the bokeh as indicated by, for example, a line dl in FIG. 17, estimating the distance is synonymous with estimating (the bokeh value indicating) the color, size, and shape of the bokeh.

Note that, for example, a configuration in which the statistical model directly estimates the distance may also be considered. However, a configuration in which the statistical model estimates the bokeh value is more versatile because the same statistical model can be used even in a case where the focus position (focal length) in the optical system has been changed.

In the present embodiment, the statistical model described above can be used to obtain (estimate) from an image a bokeh value indicating the bokeh that occurs in the image according to the distance to the subject in the image. The statistical model is generated by executing a process (hereinafter referred to as "learning process") to learn a bokeh (a bokeh that changes nonlinearly according to the distance to the subject in the image) that occurs in an image affected by the aberration of the optical system of the capture unit 2 as described above.

The following is an overview of the learning process executed to generate the statistical model (hereinafter referred to as a statistical model learning process).

Figure 18:
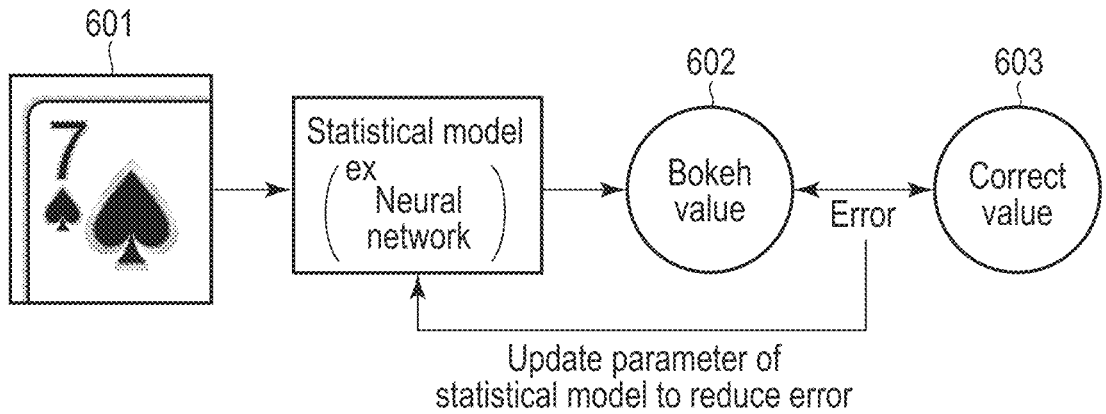
FIG. 18 shows an example of a statistical model learning process.

FIG. 18 shows an example of the statistical model learning process (learning method) in the present embodiment. The statistical model learning process is executed using images prepared for causing the statistical model to learn (hereinafter referred to as "images for learning"). The images for learning can be, for example, images captured by the capture unit 2, or may be images captured by other capture devices (camera, etc.) having an optical system that is similar to the optical system of the capture unit 2.

In the case of using any one of the first method described with reference to FIG. 12, the second method described with reference to FIG. 14, and the third method described with reference to FIG. 16 above, the statistical model learning process is basically performed by inputting (information relating to) an image for learning 601 to the statistical model, then feeding back an error between a bokeh value 602 estimated by the statistical model and a correct value 603 to the statistical model. Note that feedback corresponds to updating parameters (e.g., weight coefficients) of the statistical model so that the error decreases.

In a case where the first method is applied as the method for estimating the bokeh value from the image as described above, even during the statistical model learning process, the information (gradient data) on the local area is input to the statistical model for each local area (image patch) extracted from the image for learning 601, and the bokeh value 602 of each pixel in each local area is estimated by the statistical model. An error obtained by comparing the bokeh value 602 estimated in this manner and the correct value 603 is fed back to the statistical model.

Similarly, in a case where the second method is applied as the method for estimating the bokeh value from the image, even during the statistical model learning process, the gradient data and the position information are input to the statistical model as information relating to the local area for each local area (image patch) extracted from the image for learning 601, and the bokeh value 602 of each pixel in each local area is estimated by the statistical model. An error obtained by comparing the bokeh value 602 estimated in this manner and the correct value 603 is fed back to the statistical model.

Furthermore, in a case where the third method is applied as the method for estimating the distance from the image, information (gradient data) on all areas of the image for learning 601 is input to the statistical model at once also during the statistical model learning process, and the bokeh value 602 of each pixel in the image for learning 601 is estimated by the statistical model. An error obtained by comparing the bokeh value 602 estimated in this manner and the correct value 603 is fed back to the statistical model.

According to the above statistical model learning process, the parameters of the statistical model are updated so that the error between the bokeh value 602 and the correct value 603 decreases. In this manner, the statistical model can learn the bokeh that occurs in the image for learning 601.

Note that the statistical model in the present embodiment is generated, for example, by repeatedly executing a learning process using images for learning captured while changing the distance from the capture unit 2 to the subject in a state where the focus position is fixed. Furthermore, in a case where the learning process for one focus position is completed, by executing the learning process for other focus positions in the same manner, a statistical model with higher accuracy can be generated.

Furthermore, the correct values used in the statistical model learning process in the present embodiment are the bokeh values (i.e., bokeh values indicating the color, size and shape of the bokeh corresponding to the actual distance) converted from the actual distance to the subject when the image for learning is captured as described above.

Figure 19:
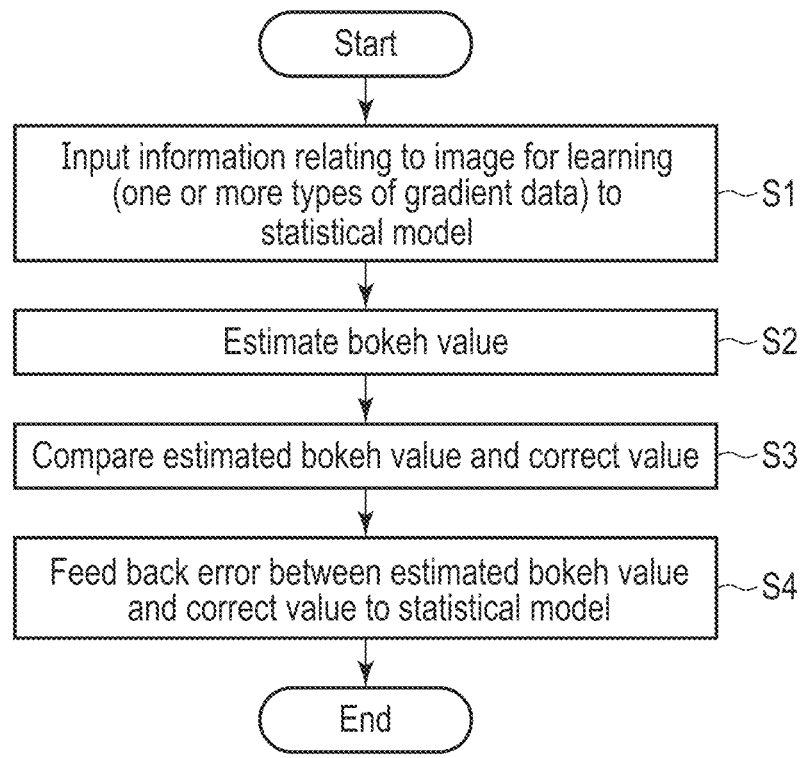
FIG. 19 is a flowchart showing an example of a processing procedure of the statistical model learning process.

Next, with reference to the flowchart in FIG. 19, an example of a processing procedure of the statistical model learning process is described. Note that, the process shown in FIG. 19 may be executed by, for example, the ranging device 1 (image processing unit 3), or by other devices, etc.

First, (information relating to) an image for learning prepared in advance is input to the statistical model (step S1). This image for learning is, for example, an image generated by the image sensor 22 based on light transmitted through the lens 21 provided in the capture unit 2, and is an image affected by the aberration of the optical system (lens 21) of the capture unit 2. Specifically, the image for learning has a bokeh that changes nonlinearly according to the distance to the subject described in FIG. 4 to FIG. 10.

Note that, in the statistical model learning process, it is assumed that images for learning are prepared in advance, in which the subject is captured at each distance with a very fine granularity from the lower limit (front) to the upper limit (back) of the distance that can be measured (estimated) by the ranging device 1. Furthermore, it is also desirable to have a variety of images of different subjects as images for learning.

In a case where the first method described above is applied as a method for estimating bokeh values from images, gradient data of the R image, G image, and B image for each local area of the image for learning is input to the statistical model as information relating to the image for learning.

In a case where the second method described above is applied as a method for estimating bokeh values from images, gradient data of the R image, the G image, and the B image and position information of the local area on the image for learning are input to the statistical model as information relating to the image for learning.

In a case where the third method described above is applied as a method for estimating bokeh values from images, gradient data of the R image, the G image, and the B image of all areas of an image for learning is input to the statistical model as information relating to the image for learning.

Note that, in the present embodiment, the gradient data of the R image, the G image, and the B image is explained as being input to the statistical model. However, in a case where the statistical model estimates the bokeh value in terms of the bokeh shape (PSF shape) occurred in the image, a gradient data of at least one of the gradient data of the R image, the G image, and the B images should be input to the statistical model. On the other hand, in a case where the statistical model estimates the bokeh value in terms of the color and size of the bokeh that occurs in the image by chromatic aberration, at least two of the gradient data of the R image, the G image, and the B image should be input to the statistical model.

After the process of step S1 is executed, the bokeh value is estimated by the statistical model (step S2).

The bokeh value estimated in step S2 is compared with a correct value obtained when the image for learning was captured (step S3).

The comparison result (error) in step S3 is fed back to the statistical model (step S4). In the statistical model, parameters are then updated to reduce the error (i.e., the bokeh that occurs in the image for learning in accordance with the distance to the subject is learned).

By repeating the above process shown in FIG. 19 for each image for learning, a statistical model with high estimation accuracy is generated. The statistical model generated in this manner is stored in the storage 31 included in the image processing unit 3.

The ranging device 1 according to the present embodiment measures the distance to a subject in an image captured by the capture unit 2 using the statistical model generated as described above.

An example of a processing procedure of the ranging device 1 (capture unit 2 and image processing unit 3) when measuring the distance to the subject will be described with reference to the sequence chart in FIG. 20.

First, the first image acquisition module 23 included in the capture unit 2 (image sensor 22) acquires an image (hereinafter referred to as the "captured image") that includes a subject captured by the capture unit 2 (image sensor 22) (step S11). This captured image is an image affected by the aberration of the optical system (lens 21) of the capture unit 2 as described above. Note that, although omitted in FIG. 20, the captured image acquired in step S11 may be recorded in the capture unit 2.

Next, the first focus position information acquisition module 24 included in the capture unit 2 acquires focus position information relating to the focus position when the above-mentioned captured image was captured (step S12).

The focus position information in the present embodiment will be explained below with reference to FIG. 21. FIG. 21 schematically shows the optical system of the capture unit 2.

As shown in FIG. 21, the focus position (a position at which the image captured by the capture unit 2 is in focus) depends on the distance between the lens 21 and the image sensor 22 (lens relative position). In other words, the focus position is adjusted (set) by moving the position of the lens 21 (i.e., driving the lens 21) parallel to an optical axis of the optical system.

As mentioned above, the lens 21 configures a lens unit. The lens unit includes a signal processing unit 2a and a lens drive unit 2b. The signal processing unit 2a and the lens drive unit 2b operate to control the position of the lens 21. Specifically, the signal processing unit 2a generates a control signal value (adjustment value) for driving the lens 21 according to an instruction (e.g., focus position specified by an autofocus function) from a control circuit (not shown) that controls the operation of the capture unit 2 (camera), and transmits the control signal value to the lens drive unit 2b. The lens drive unit 2b drives the lens 21 based on the control signal value transmitted from the signal processing unit 2a.

In a case where the focus position is adjusted by driving the lens 21 in the manner described above, the control signal value for driving the lens 21 can be used as the focus position information.

Specifically, for example, in a case where the position of the lens 21 is mechanically controlled by electrical drive, a voltage value corresponding to the amount of movement of any lens 21 in the signal processing unit 2a is generated as the control signal value, and is transmitted to the lens drive unit 2b. In this case, the voltage value transmitted from the signal processing unit 2a to the lens drive unit 2b is used as the focus position information.

Furthermore, in a configuration in which a unique focus adjustment amount with respect to a preset focus position (reference value) is held within camera photography software (software that operates to capture images), the focus adjustment amount is transmitted to the signal processing unit 2a, and the voltage value converted from the focus adjustment amount is transmitted from the signal processing unit 2a to the lens drive unit 2b. In this case, it is assumed that the focus adjustment amount held within the software (i.e., the focus adjustment amount transmitted to the signal processing unit 2a) corresponds to the control signal value for driving the lens 21 and may be used as the focus position information.

Note that the control signal value for driving the lens 21 described here is an example, and the focus position information may be other control signal values related to driving the lens 21.

Furthermore, the focus position information may be, for example, information relating to the position of the lens 21 moving parallel to an optical axis of the optical system of the capture unit 2.

Specifically, in some cases, the focus position (i.e., the position of the lens 21) may be adjusted by manually turning, for example, a lens barrel 21a in which the lens 21 is arranged or other screws, etc. In this case, for example, the number of rotations of the lens barrel 21a or screws can be used as the focus position information.

Furthermore, the relative position of the lens 21 inside the lens barrel 21a (i.e., the position of the lens 21 with respect to the image sensor 22) may be used as the focus position information. The relative position of this lens 21 may be, for example, the distance between a principal point 21b of the lens 21 and the image sensor 22, or the position of the principal point 21b of the lens 21 with respect to a reference point of the lens barrel 21a. Although the case of using the principal point 21b of the lens 21 is mainly described here, it is not necessary to use the principal point 21b of the lens 21. For example, the distance between the distal end portion of the lens 21 and the end of the lens barrel 21a may be used as the focus position information. The relative position of the lens 21 described above can be obtained by using, for example, a predetermined sensor, or may also be obtained by other methods.

Note that, although it is explained in step S12 that the focus position information related to the focus position when the captured image was captured is acquired, the focus position information can be acquired at the time the focus position is adjusted (set). In other words, the process in step S12 may be executed after the focus position is adjusted and before the captured image is captured (i.e., the process in step S11 is executed).

Although it is explained in step S12 that the focus position information is acquired, in a case where there is no focus position information relating to the focus position at the time the captured image was captured (or such focus position information cannot be obtained), the focus position information prepared in advance (or focus position information that is manually set) may be acquired.

Next, the focus position information acquired in step S12 is added to the captured image acquired in step S11 (step S13). In this case, the focus position information is recorded in the captured image as a metafile (metadata) of the image, such as an exchangeable image file format (EXIF), which is a format for a digital camera that can save, for example, the date and time when the image was captured and other setting data (focal length, aperture value, etc.). According to this, a captured image is acquired, in which the focus position information is embedded in a header section as a metafile.

The focus position information is described here as being embedded in the captured image; however, the focus position information may also be added to the captured image as another electronic file.

When the process of step S13 is executed, the captured image with the focus position information added in step S13 is transmitted from the capture unit 2 to the image processing unit 3 (step S14).

The captured image transmitted in step S14 is received by the image processing unit 3. Thereby, the second image acquisition module 32 included in the image processing unit 3 acquires the captured image received by the image processing unit 3 (step S15).

In addition, the second focus position information acquisition module 33 included in the image processing unit 3 acquires the focus position information added to the captured image acquired in step S15 (step S16).

Next, the second focus position information acquisition module 33 acquires an actual focus distance (i.e., the distance from the ranging device 1 to the focus position) based on the focus position information acquired in step S16 (step S17).

Here, FIG. 22 shows the correspondence between the focus position information and the actual focus distance. Note that, in FIG. 22, normalized focus position information and actual focus distance are shown for convenience.

In the present embodiment, a mathematical model (actual focus distance conversion model) representing the correspondence (relationship) between the focus position information and the actual focus distance as shown in FIG. 22 is held in the image processing unit 3 (second focus position information acquisition module 33). According to this, the second focus position information acquisition module 33 can acquire the actual focus distance by converting the focus position information acquired in step S16 into the actual focus distance by referring to such a mathematical model.

Here, the correspondence between the focus position information and the actual focus distance is described as being held in the image processing unit 3 in the form of a mathematical model; however, the correspondence may also be held in the form of a table.

Note that the above-mentioned correspondence between the focus position information and the actual focus distance is obtained in advance, for example, by experimental means (i.e., by actually measuring the actual focus distance corresponding to the focus position information).

When the process of step S17 is executed, the bokeh value acquisition module 34 inputs the captured image acquired in step S15 to the statistical model stored in the storage 31, and acquires the bokeh value output from the statistical model (i.e., the bokeh value estimated by the statistical model) (step S18). The bokeh value acquired in step S18 corresponds to relative distance information according to the distance to the subject in the captured image as described above. The process in step S18 corresponds to the processes in steps S1 and S2 shown in FIG. 1 above. Therefore, here, a detailed explanation thereof is omitted.

Figure 20:
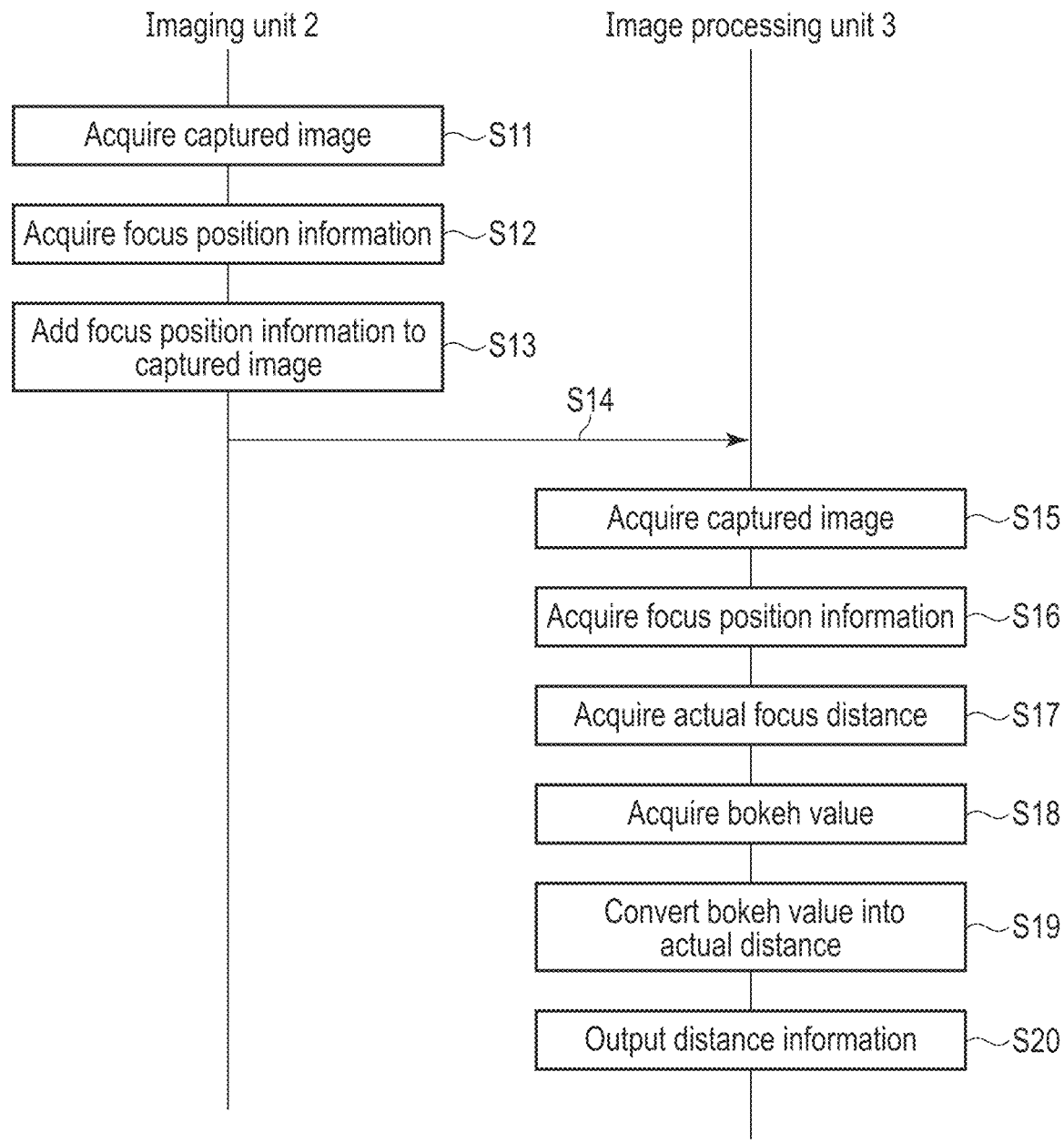
FIG. 20 is a sequence chart showing an example of a processing procedure of a ranging device when measuring the distance to a subject.

Note that, in FIG. 20, the process is executed in the order of steps S17 and S18; however, the order in which steps S17 and S18 are executed may be switched.

Next, the actual distance conversion module 35 converts the bokeh value acquired in step S18 into an actual distance (i.e., an actual distance to the subject in the captured image) based on the actual focus distance acquired in step S17 (step S19).

Here, an actual distance u converted from the bokeh value in step S19 is expressed by the following expression (1) using a bokeh value b.

$$u = \frac{f^2 u_f}{f^2 - 2Fu_f b} \quad \text{(Expression 1)}$$

In the expression (1), "f" represents the focal length in the optical system (lens 21) of the capture unit 2 that captured the captured image. "$U_f$" represents the actual focus distance when the captured image was captured. "F" represents the F-number (aperture value) in the optical system of the capture unit 2 that captured the captured image.

That is, in the present embodiment, the actual distance can be calculated by applying the actual focus distance acquired in step S17, the bokeh value acquired in step S18, the focal length and the F-number in the optical system of the capture unit 2 to the expression (1).

Note that the focal length and the F-number in the optical system of the capture unit 2 can be acquired from the capture unit 2 since they are held in the memory mounted in the lens unit (control circuit) as the lens information described above. Furthermore, the lens information (focal length and F-number) may be added (recorded) to the captured image as a metafile in the same manner as the focus position information described above.

After the process of step S19 is executed, the output module 36 outputs the distance information indicating the distance converted from the bokeh value in step S19 in a map format arranged so as to be positionally associated with, for example, the captured image (step S20). Note that, in the present embodiment, the distance information is described as being output in the map format, but may also be output in other formats.

Note that, here, it is described that the process of converting the focus position information acquired in the capture unit 2 (first focus position information acquisition module 24) into the actual focus distance is executed by referring to, for example, the actual focus distance conversion model. However, if it is possible to measure (acquire) the distance to a subject in focus in the captured image (e.g., one of the plurality of subjects in the captured image) using, for example, a distance sensor or the like external to the ranging device 1, the distance (measured value) can be used as the actual focus distance. For example, as the distance sensor, Lidar (light detection and ranging) and the like, which is capable of measuring the distance to the subject by receiving a reflected wave of light (electromagnetic wave) transmitted to the subject, can be used. According to such a configuration, the process of converting the focus position information into the actual focus distance (actual focus distance conversion process) in the image processing unit 3 can be omitted. Therefore, accuracy of the actual distance (the actual distance from the camera to the subject converted from the bokeh value using the actual focus distance) can be improved based on the actual focus distance while reducing processing costs (calculation costs).

In FIG. 20, a case in which one statistical model is stored in the storage 31 is assumed and described. However, in a case where the ranging device 1 is configured in a manner that the lenses can be replaced as described above, a statistical model may be prepared for each lens that can be used in the ranging device 1 (i.e., lens that can be attached to the ranging device 1). In this case, for example, the ranging device 1 may be configured to use the above-mentioned lens information (information on lens specifications or design values including focal length, f-number, camera model name, etc.) to select a statistical model for the lens attached to the ranging device 1 and use the selected statistical model to estimate the bokeh value.

As described above, in the present embodiment, the captured image (a second image captured by the capture unit 2 and affected by aberration of the optical system of the capture unit 2) is acquired, the focus position information relating to the focus position at the time the captured image was captured is acquired, the bokeh value output from the statistical model (bokeh value indicating the bokeh occurred in the subject in the captured image) is acquired by inputting the captured image to the statistical model (a statistical model generated by learning the bokeh that changes non-linearly according to the distance to the subject in the first image and that occurs in the first image affected by the aberration of the optical system of the capture unit 2), and the bokeh value is converted into the actual distance to the subject based on the focus position information.

In the present embodiment, when acquiring the captured image as described above, by acquiring the focus position information relating to the focus position when the captured image was captured, the accuracy of the distance measured from the captured image can be improved.

Specifically, in order to convert a bokeh value indicating a bokeh that occurs in the subject in the captured image into an actual distance, the actual focus distance is necessary, as expressed in the above expression (1). In a case where the actual focus distance is set, for example, manually, errors due to human factors (setting errors of the actual focus distance) may occur, and such errors in the actual focus distance will cause deterioration in the accuracy of the actual distance converted from the bokeh value.

Furthermore, for example, in a case where the position of a subject is excessively far from the focus position (i.e., the bokeh size is excessively large), the actual distance to the subject may not be able to be measured by the ranging device 1. In this case, the focus position may be changed (adjusted) when capturing an image that includes the subject. For example, even if an accurate actual focus distance is set before the focus position is changed, in the case where the focus position is changed in this manner, it is necessary to newly set an actual focus distance (actual distance from the ranging device 1 to the focus position) based on the changed focus position, which may cause errors based on the above-mentioned human-related factors. Furthermore, time and effort will be required to measure and set the actual focus distance in accordance with the change of the focus position.

In contrast, since the present embodiment has a configuration that acquires the focus position information at the time the captured image was captured, and converts the bokeh value into the actual distance based on the focus position information, setting errors of the actual focus distance can be avoided, and changes in the focus position when capturing a captured image can be easily responded to.

Note that, as the focus position information in the present embodiment, for example, the control signal value for driving the lens 21, or the position of the lens moving in parallel to the optical axis of the optical system of the capture unit 2 can be used.

Furthermore, since the present embodiment has a configuration in which the focus position information is converted into the actual focus distance by referring to the actual focus distance conversion model, and the bokeh value is converted into the actual distance using the actual focus distance, an appropriate actual distance to the subject can be measured (acquired).

Furthermore, in the present embodiment, the focus position information acquired in the capture unit 2 (first focus position information acquisition module 24) capturing the captured image is added to the captured image and transmitted to the image processing unit 3. The focus position information may be embedded in the header section of the captured image as metadata (metafile), or may be added to the captured image as an electronic file that is different from the captured image. That is, in the present embodiment, the focus position information relating to the captured image acquired on the capture unit 2 side and the focus position at which the captured image is captured should be passed from the capture unit 2 to the image processing unit 3.

In general, there are individual differences among cameras (cameras as products) incorporated in the ranging device 1, and the correspondence between the focus position information and the actual focus distance described above may differ for each individual camera.

For this reason, in the present embodiment, for example, as shown in FIG. 23, the capture unit 2 may further include a focus position information correction module 25.

The focus position information correction module 25 corrects the focus position information acquired by the first focus position information acquisition module 24 based on correction values held (prepared) in advance. The focus position information corrected by the focus position information correction module 25 is added to the image acquired by the first image acquisition module 23 and transmitted from the capture unit 2 to the image processing unit 3.

Here, it is described in the present embodiment that the actual focus distance conversion model representing the correspondence between the focus position information and the actual focus distance is held in advance in the image processing unit 3 (second focus position information acquisition module 33). However, the correction value held by the focus position information correction module 25 is a value for correcting the focus position information so that the focus position information acquired by the first focus position information acquisition module 24 is converted into an appropriate actual focus distance with reference to the actual focus distance conversion model (i.e., to absorb the individual differences described above).

This correction value (i.e., the amount of deviation of the focus position information between the camera incorporated in the ranging device 1 and a reference camera) is acquired by comparing, for example, the correspondence between the focus position information and the actual focus distance (the actual distance from the ranging device 1 to the focus position) when an image is captured at any focus position during product inspection, etc., at the time of shipment of the product (camera) and (the correspondence between the focus position information and the actual focus distance represented by) the actual focus distance conversion model held in the above-mentioned image processing unit 3.

According to such a configuration, even if there are individual differences in the cameras incorporated in the ranging device 1, the actual distance to the subject can be appropriately measured based on the focus position information that has been corrected to absorb such individual differences.

Although it is described here that the focus position information is corrected by the capture unit 2 (focus position information correction module 25), the correction of the focus position information may also be executed, for example, on the image processing unit 3 side.

In the present embodiment, the image processing unit 3 is described as including each of the components 31 to 36. However, for example, the storage 31 may be arranged in an external device different from the ranging device 1. In this case, the image processing unit 3 may operate in a manner using a statistical model acquired from an external device. The present embodiment may also have a configuration in which, for example, some of the processing executed by each of the modules 32 to 36 is executed by an external device.

(Application Example)

Hereinafter, an application example to which the ranging device 1 according to the present embodiment is applied will be described.

Figure 24:
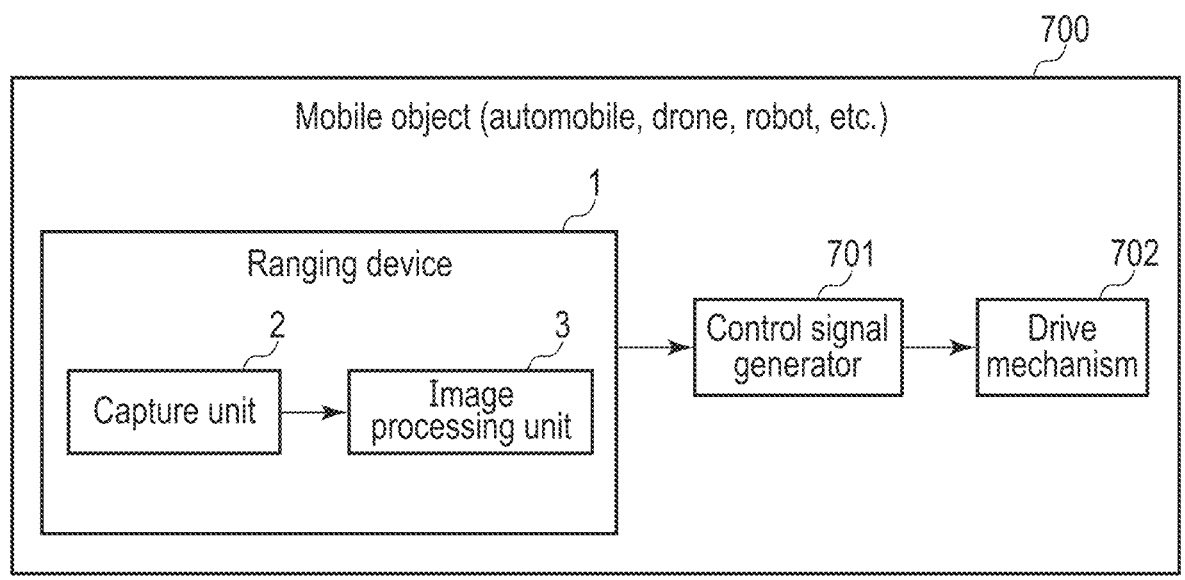
FIG. 24 shows an example of a functional configuration of a mobile object in which the ranging device is incorporated.

FIG. 24 shows an example of a functional configuration of a mobile object 700 in which the ranging device 1 is incorporated. The mobile object 700 can be realized, for example, as an automobile with an automatic driving function, an unmanned aircraft, a self-supporting mobile robot, and the like. An unmanned aircraft is an airplane, rotary-wing aircraft, glider, or airship that cannot be manned and can be flown by remote control or autopilot, and includes, for example, drones (multicopters), radio-controlled aircraft, and helicopters for spraying agricultural chemicals. A self-supporting mobile robot includes a mobile robot such as an automated guided vehicle (AGV), a cleaning robot for sweeping floors, a communication robot for providing various types of guidance to visitors, etc. The mobile object 700 includes not only those in which the robot body moves, but also industrial robots with a drive mechanism that moves or rotates a part of the robot, such as a robot arm.

As shown in FIG. 24, the mobile object 700 includes, for example, the ranging device 1, a control signal generator 701, and a drive mechanism 702. The ranging device 1 is installed so that, for example, the capture unit 2 can capture a subject in the traveling direction of the mobile object 700 or a part thereof.

Figure 25:
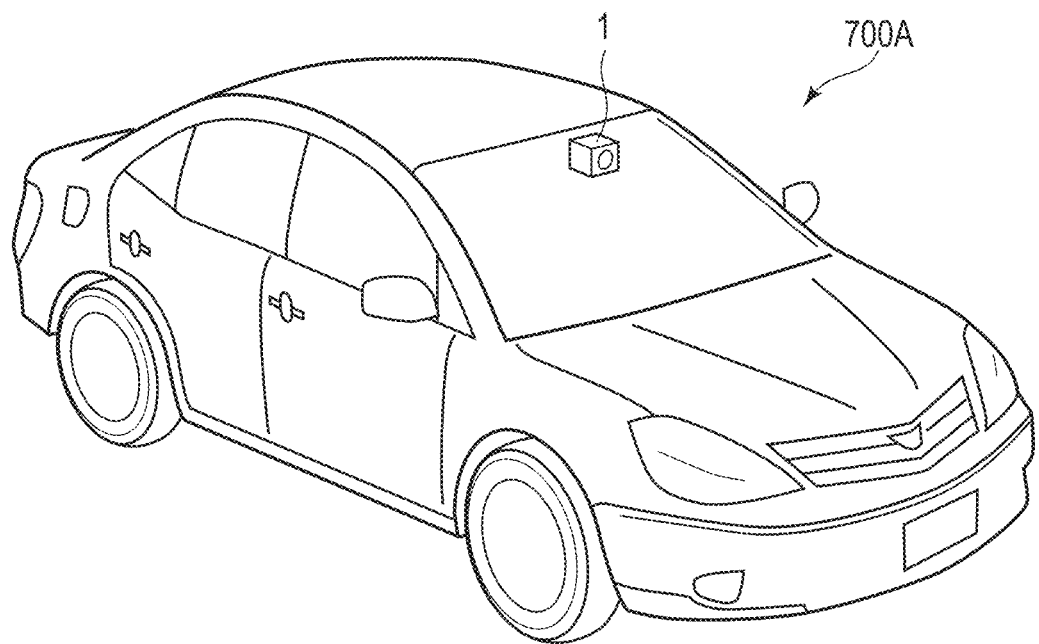
FIG. 25 illustrates a case where the mobile object is an automobile.

As shown in FIG. 25, in a case where the mobile object 700 is an automobile 700A, the ranging device 1 is installed as a so-called front camera that captures images in front. Note that the ranging device 1 may also be installed as a so-called rear camera that captures images of the rear when backing up. Furthermore, a plurality of ranging devices 1 may be installed as the front camera and the rear camera. Furthermore, the ranging device 1 may also be installed to function as a so-called drive recorder as well. That is, the ranging device 1 may also be a recording device.

Figure 26:
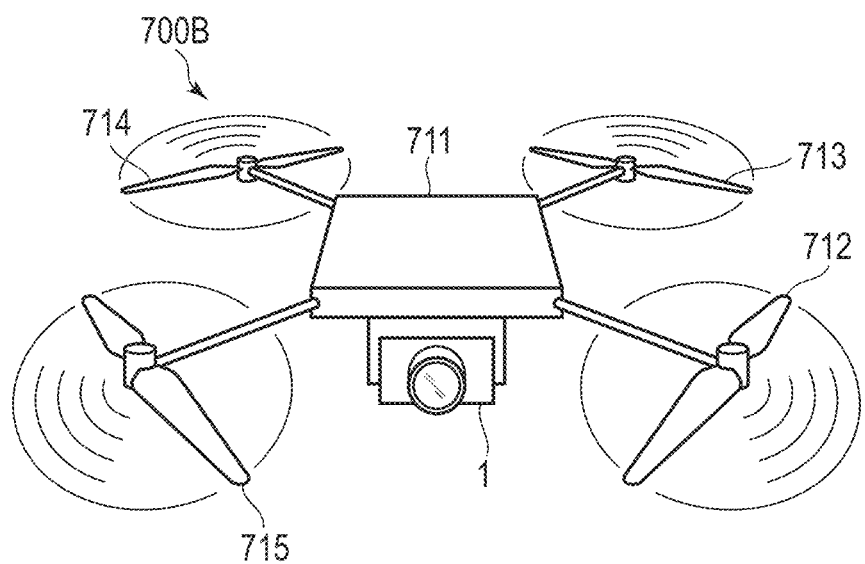
FIG. 26 illustrates a case where the mobile object is a drone.

FIG. 26 shows an example of a case where the mobile object 700 is a drone 700B. The drone 700B includes a drone body 711 corresponding to the drive mechanism 702 and four propeller parts 712 to 715. Each of the propeller parts 712 to 715 has a propeller and a motor. When the drive of the motor is transmitted to the propellers, the propellers rotate, and the drone 700B floats by the lift force generated by the rotation. The ranging device 1 is mounted on, for example, the lower part of the drone body 711.

Figure 27:
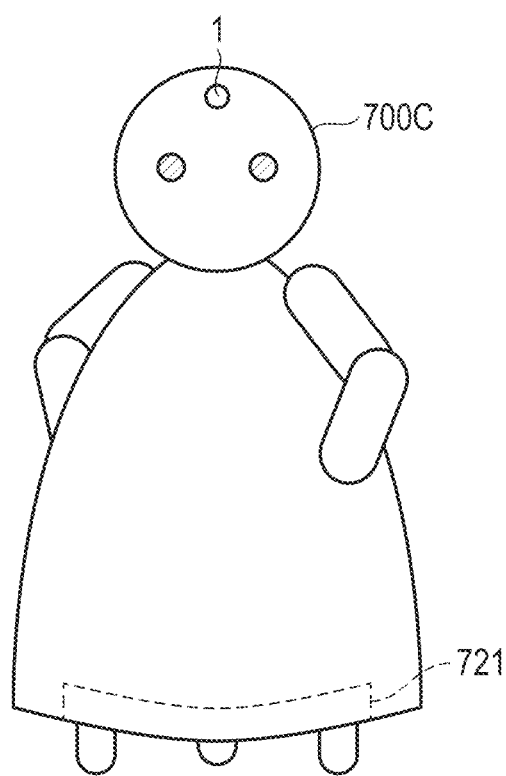
FIG. 27 illustrates a case where the mobile object is a self-supporting mobile robot.

FIG. 27 shows an example of a case in which the mobile object 700 is a self-supporting mobile robot 700C. In the lower part of the mobile robot 700C, a power unit 721 including a motor, wheels, etc., corresponding to the drive mechanism 702 is provided. The power unit 721 controls the rotation speed of the motor and the direction of the wheels. When the motor drive is transmitted, the wheels installed on the road or floor surface rotate, and the direction of the wheels are controlled, thereby enabling the mobile robot 700C to move in any direction. In the example shown in FIG. 27, the ranging device 1 is installed on the head part of the mobile robot 700C so that, for example, the capture unit 2 captures images on the front side of the humanoid mobile robot 700C. Note that the ranging device 1 may also be installed to capture images on the rear or left and right sides of the mobile robot 700C, or may be installed in multiple locations to capture images in multiple directions. In addition, dead reckoning can also be performed by installing the ranging device 1 on a small robot, which has little space for mounting sensors and other devices, to estimate its own position, posture, and the position of the subject.

Figure 28:
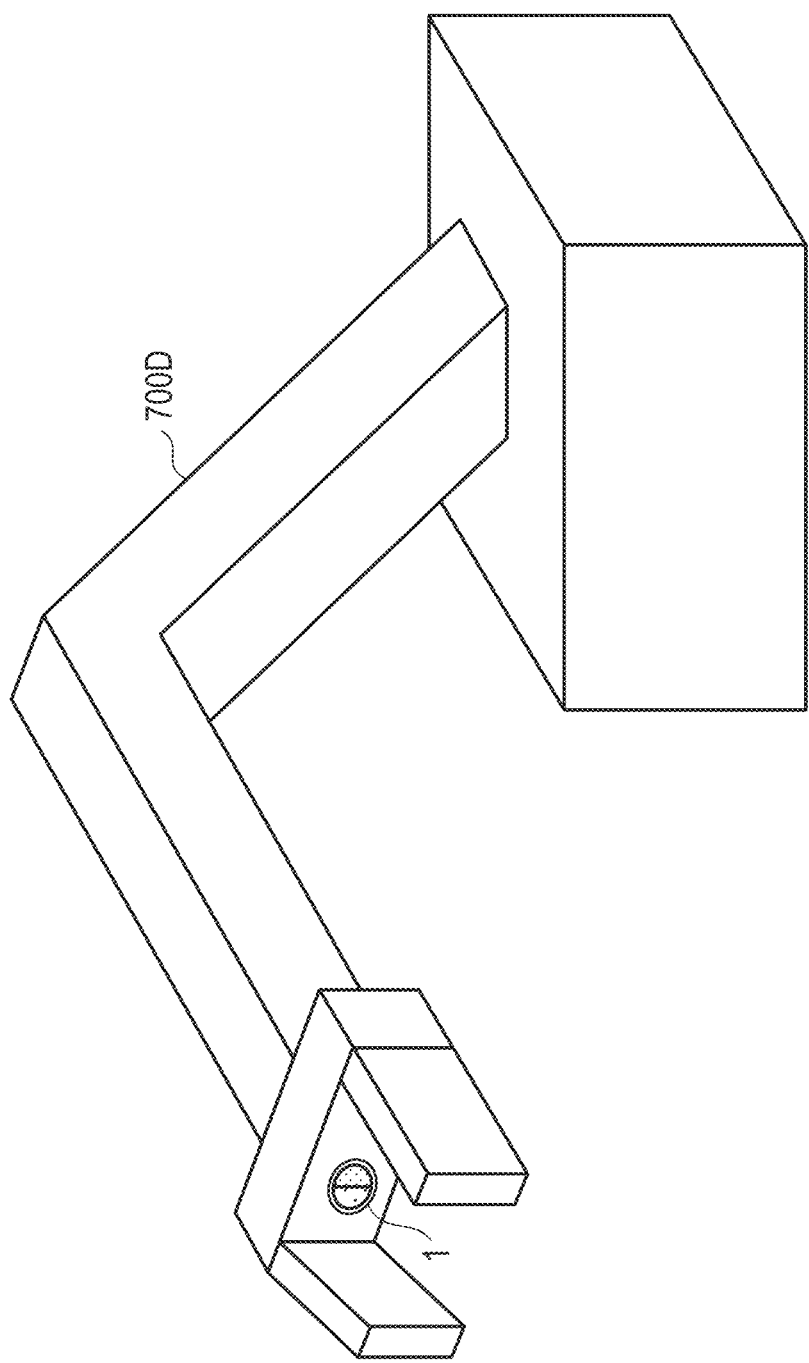
FIG. 28 illustrates a case where the mobile object is a robot arm.

Note that, as shown in FIG. 28, in a case where the mobile object 700 is a robot arm 700D, and the movement and rotation of a part of the robot arm 700D are controlled, the ranging device 1 may be installed at a distal end, etc., of the robot arm 700D. In this case, an object to be grasped by the robot arm 700D is captured by the capture unit 2 provided in the ranging device 1, and the image processing unit 3 is able to measure the distance to the object to be grasped by the robot arm 700D. This enables the robot arm 700D to perform an accurate grasping operation of the object.

The control signal generator 701 outputs a control signal for controlling the drive mechanism 702 based on distance information indicating the distance to the subject output from the ranging device 1 (image processing unit 3). The drive mechanism 702 drives the mobile object 700 or a part of the mobile object 700 by the control signal output from the control signal generator 701. The drive mechanism 702 performs, for example, at least one of the following for the mobile object 700 or a part of the mobile object 700: moving, rotating, accelerating, decelerating, increasing/decreasing thrust (lift), changing travel directions, switching between a normal operation mode and an automatic operation mode (collision avoidance mode), and activating safety devices such as airbags. The drive mechanism 702 may perform at least one of the following in a case where, for example, the distance to the subject is less than a threshold value: moving, rotating, accelerating, increasing/decreasing thrust (lift), changing directions to approach the object, and switching from the automatic operation mode (collision avoidance mode) to the normal operation mode.

Note that the drive mechanism 702 of the automobile 700A shown in FIG. 25 is, for example, a tire. The drive mechanism 702 of the drone 700B shown in FIG. 26 is, for example, a propeller. The drive mechanism 702 of the mobile robot 700C shown in FIG. 27 is, for example, a leg. The drive mechanism 702 of the robot arm 700D shown in FIG. 28 is, for example, a support unit that supports the distal end where the ranging device 1 is installed.

The mobile object 700 may be further provided with a speaker or display to which information relating to the distance to the subject (distance information) output from the ranging device 1 is input. The speaker or display is wired or wirelessly connected to the ranging device 1 and is configured to output audio or images related to the distance to the subject. Furthermore, the mobile object 700 may include a light-emitting unit to which information related to the distance to the subject output from the ranging device 1 is input, and that can, for example, be turned on and off in accordance with the distance to the subject.

In the case where the mobile object 700 is, for example, a drone 700B, when creating a map (three-dimensional shape of an object), performing structural survey of a building or terrain, or performing inspection of cracks, wire breaks, etc., from the sky, the capture unit 2 acquires images of an object and determines whether or not the distance to a subject is greater than or equal to a threshold value. Based on this determination result, the control signal generator 701 generates a control signal for controlling the thrust of the drone 700B so that the distance to the inspection target becomes constant. Here, the thrust is considered as including lifting. By operating the drone 700B based on this control signal, the drive mechanism 702 can fly the drone 700B in parallel with the inspection target. In a case where the mobile object 700 is a drone 700B for surveillance, the control signal generator 701 may generate control signals for controlling the thrust of the drone 700B to maintain a constant distance from the object to be monitored.

Note that, in a case where the mobile object 700 (e.g., drone 700B) is used for maintenance inspection of various infrastructures (hereinafter simply referred to as "infrastructure"), the distance to a repair point can be obtained by capturing an image of the point in the infrastructure that needs to be repaired (hereinafter referred to as "repair point"), including cracks or rusted points, etc., with the capture unit 2. In this case, the size of the repair point can be calculated from the image by using the distance to the repair point. According to this, for example, by displaying the repaired point on a map showing the entire infrastructure, the maintenance inspector of the infrastructure can recognize the repair point. In addition, it is useful to inform the maintenance inspector of the size of the repaired point in advance in order to carry out smooth repair work.

Note that, here, a case in which the mobile object 700 (for example, the drone 700B) into which the ranging device 1 is incorporated is used for maintenance inspection, etc., of infrastructure is described. However, for example, in a case where the ranging device 1 is realized as a smartphone or the like, the maintenance inspector, for example, can use the smartphone to capture images of the repair point to perform maintenance inspections of the infrastructure. Furthermore, in a case where the capture device provided in the above-mentioned ranging system is realized as a smartphone or the like, the maintenance inspector can realize the same maintenance inspection by uploading the image of the repair point captured by the smartphone to the image processing device.

When uploading the image, for example, by using a method of transferring the image to an image processing device on a server via a network, inspection work can be easily performed at the site of maintenance inspection.

Furthermore, during the flight of the drone 700B, the capture unit 2 acquires an image captured in the direction of the ground, and determines whether or not the distance to the ground is equal to or greater than a threshold value. The control signal generator 701 generates a control signal for controlling the thrust of the drone 700B so that the height from the ground becomes a designated height based on this determination result. By operating the drone 700B based on this control signal, the drive mechanism 702 can fly the drone 700B at the designated height. If the drone 700B is a drone for spraying pesticides, keeping the height of the drone 700B from the ground constant in this manner facilitates spraying the pesticides evenly.

Furthermore, in the case where the mobile object 700 is the automobile 700A or the drone 700B, the capture unit 2 captures an image of an automobile in front or a surrounding drone during regimental running of the automobile 700A or the coordinated flight of the drone 700B, and determines whether or not the distance to the automobile or the drone is greater than or equal to a threshold value. Based on this determination result, the control signal generator 701 generates a control signal for controlling the speed of the automobile 700A and the thrust of the drone 700B so that the distance to the automobile in front and the surrounding drone is constant. By operating the automobile 700A and the drone 700B based on this control signal, the drive mechanism 702 can easily perform the regimental running of the automobile 700A and the coordinated flight of the drone 700B.

Furthermore, in the case where the mobile object 700 is the automobile 700A, the mobile object 700 may be configured in a manner that a driver's instruction can be received via a user interface so that the driver of the automobile 700A can set (change) the threshold value. As a result, the driver can drive the automobile 700A at an inter-vehicle distance the driver prefers. Furthermore, in order to maintain a safe inter-vehicle distance from the automobile in front, the threshold value may be changed according to the speed of the automobile 700A. The safe inter-vehicle distance depends on the speed of the automobile 700A. Therefore, the faster the speed of the automobile 700A, the larger (longer) the threshold value can be set.

Furthermore, in the case where the mobile object 700 is the automobile 700A, a predetermined distance in the traveling direction may be set to a threshold value, and a control signal may be generated to activate a break or a safety device such as an airbag when an object appears in front of the threshold value. In this case, an automatic break or a safety device such as an airbag is provided in the drive mechanism 702.

Each of the various functions described in the present embodiment may be realized by a circuit (processing circuit). Examples of processing circuit include a programmed processor, such as a central processing unit (CPU). This processor executes each of the described functions by executing a computer program (instruction set) stored in the memory. This processor may be a microprocessor that includes an electrical circuit. Examples of the processing circuit include a digital signal processor (DSP), an application-specific integrated circuit (ASICs), a microcontroller, a controller, and other electrical circuit components. Each of the other components besides the CPU described in the present embodiment may also be realized by the processing circuit.

Since the various processes of the present embodiment can be realized by a computer program, the same effects as those of the present embodiment can be easily realized by simply installing and executing this computer program on a computer through a computer-readable storage medium storing this computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A ranging device comprising a capture unit, the ranging device comprising:
    storage configured to store a statistical model generated by learning a bokeh that occurs in a first image affected by aberration of an optical system of the capture unit and that changes nonlinearly according to a distance to a subject in the first image;
    a processor configured to:
    acquire a second image captured by the capture unit and affected by aberration of the optical system of the capture unit;
    acquire focus position information relating to a focus position when the second image was captured;
    acquire a bokeh value indicating a bokeh of a subject in the second image, which is output from the statistical model by inputting the acquired second image to the statistical model; and
    convert the acquired bokeh value into a distance to the subject based on the acquired focus position information.

2. The ranging device of claim 1, wherein
    the optical system of the capture unit includes a lens that moves in a direction parallel to an optical axis of the optical system, and
    the focus position information includes a control signal value for driving the lens.

3. The ranging device of claim 1, wherein
    the optical system of the capture unit includes a lens that moves in a direction parallel to an optical axis of the optical system, and
    the focus position information includes a position of the lens.

4. The ranging device of claim 1, wherein
    the processor is configured to:
    convert the acquired focus position information into a distance to the focus position; and
    convert the acquired bokeh value into a distance to the subject based on a distance to the focus position converted from the focus position information.

5. The ranging device of claim 1, wherein the focus position information is added to the second image in the capture unit and transmitted from the capture unit.

6. The ranging device of claim 5, wherein the focus position information is embedded in a header section of the second image as metadata.

7. The ranging device of claim 5, wherein the focus position information is added to the second image as an electronic file different from the second image.

8. The ranging device of claim 1, wherein the processor is configured to correct the acquired focus position information based on a correction value held in advance.

9. An image processing device connected to a capture device, the image processing device comprising:
- storage configured to store a statistical model generated by learning a bokeh that occurs in a first image affected by aberration in an optical system of the capture device and that changes nonlinearly according to a distance to a subject in the first image;
- a processor configured to:
- acquire, from the capture device, a second image captured by the capture device and affected by aberration of the optical system of the capture device;
- acquire, from the capture device, focus position information relating to a focus position when the second image was captured;
- acquire a bokeh value indicating a bokeh of a subject in the second image, which is output from the statistical model by inputting the acquired second image to the statistical model; and
- convert the acquired bokeh value into a distance to the subject based on the acquired focus position information.

10. A method executed by a ranging device comprising a capture unit and storage configured to store a statistical model generated by learning a bokeh that occurs in a first image affected by aberration of an optical system of the capture unit and that changes nonlinearly according to a distance to a subject in the first image, the method comprising:
- acquiring a second image captured by the capture unit and affected by aberration of the optical system of the capture unit;
- acquiring focus position information relating to a focus position when the second image was captured;
- acquiring a bokeh value indicating a bokeh of a subject in the second image, which is output from the statistical model by inputting the acquired second image to the statistical model; and
- converting the acquired bokeh value into a distance to the subject based on the acquired focus position information.

* * * * *